United States Patent
Izumida et al.

(10) Patent No.: US 10,759,304 B2
(45) Date of Patent: Sep. 1, 2020

(54) CONVEYANCE SEAT

(71) Applicants: TS TECH CO., LTD., Asaka-shi, Saitama (JP); HONDA MOTOR CO., LTD., Tokyo (JP)

(72) Inventors: Makoto Izumida, Tochigi (JP); Yuji Ueno, Tochigi (JP); Koki Sato, Saitama (JP); Masahiro Imamura, Saitama (JP)

(73) Assignees: TS Tech Co., Ltd., Saitama (JP); Honda Motor Co., Ltd., Tokyo (JP)

( * ) Notice: Subject to any disclaimer, the term of this patent is extended or adjusted under 35 U.S.C. 154(b) by 5 days.

(21) Appl. No.: 16/113,528

(22) Filed: Aug. 27, 2018

(65) Prior Publication Data

US 2019/0061560 A1 Feb. 28, 2019

(30) Foreign Application Priority Data

Aug. 30, 2017 (JP) .................................. 2017-166048

(51) Int. Cl.
*B60N 2/30* (2006.01)
*B60N 2/005* (2006.01)
*B64D 11/06* (2006.01)

(52) U.S. Cl.
CPC .......... *B60N 2/005* (2013.01); *B60N 2/3006* (2013.01); *B60N 2/3043* (2013.01); *B64D 11/064* (2014.12); *B64D 11/0696* (2013.01)

(58) Field of Classification Search
CPC ................................................ B64D 11/064; B60N 2002/022; B60N 2/005; B60N 2/10; B60N 2/143;

(Continued)

(56) References Cited

U.S. PATENT DOCUMENTS 1,957,004 A * 5/1934 Smith ....................... B60N 2/10
                                                                                          297/325
4,484,776 A * 11/1984 Gokimoto ................ B60N 2/10
                                                                                        296/65.09

(Continued)

FOREIGN PATENT DOCUMENTS

CN          105209289 A    12/2015
FR          2 866 609 A1    8/2005

(Continued)

OTHER PUBLICATIONS

Office Action issued in related application JP 2017-166048, dated Jul. 23, 2019, with machine generated English language translation, 10 pages.

*Primary Examiner* — Kyle J. Walraed-Sullivan
(74) *Attorney, Agent, or Firm* — Faegre Drinker Biddle & Reath LLP

(57) ABSTRACT

A vehicle seat includes: a leg member, attached to a lower end portion of a seat main body movable between use and stowed positions and movable along with a seat main body, and a leg holding member, elastically deformable to hold a holding target portion of the leg member. The leg holding member includes separated first and second portions which are configured to hold the holding target portion having passed through an introduction opening of the leg holding member formed between the first and second portions with the holding target portion interposed between the first and second portions when the leg member moves along with the seat main body moving toward the use position. A deformation amount restriction portion restricts deformation generated when the leg holding member is elastically deformed so that the first and second portions are separated when the holding target portion passes through the introduction opening.

19 Claims, 18 Drawing Sheets

(58) Field of Classification Search
CPC . B60N 2/146; B60N 2/20; B60N 2/30; B60N 2/3038; B60N 2/304; B60N 2/3022; B60N 2/3029; B60N 2/3031; B60N 2/3036; B60N 2/3002; B60N 2/3004; B60N 2/3006; B60N 2/3043; B60N 2/3072; B60N 2/3075; B60N 2/77; B60N 2/79

See application file for complete search history.

(56) References Cited

U.S. PATENT DOCUMENTS

| | | | | |
|---|---|---|---|---|
| 4,627,656 A * | 12/1986 | Gokimoto | | B60N 2/10 296/65.09 |
| 4,667,917 A * | 5/1987 | Takace | | B60N 2/10 248/398 |
| 5,498,051 A * | 3/1996 | Sponsler | | B60N 2/01583 296/65.03 |
| 5,577,805 A * | 11/1996 | Glinter | | B60N 2/01583 297/378.12 |
| 5,626,391 A * | 5/1997 | Miller | | B60N 2/01583 297/331 |
| 5,662,368 A * | 9/1997 | Ito | | B60N 2/01583 296/65.05 |
| 6,345,856 B1 * | 2/2002 | Minai | | B60N 2/01583 296/65.03 |
| 6,460,922 B1 * | 10/2002 | Demick | | B60N 2/3034 296/65.11 |
| 6,830,295 B2 * | 12/2004 | Duquesnay | | B60N 2/01583 297/336 |
| 7,270,375 B2 * | 9/2007 | Lutzka | | B60N 2/01583 297/331 |
| 8,602,495 B2 * | 12/2013 | Jeong | | B60N 2/3065 297/334 |
| 9,643,519 B2 * | 5/2017 | Nakamura | | B60N 2/065 |
| 9,663,005 B2 * | 5/2017 | Kimura | | B60N 2/12 |
| 10,427,561 B2 * | 10/2019 | Akutsu | | B60N 2/12 |
| 2004/0056521 A1 * | 3/2004 | Kayumi | | B60N 2/01 297/334 |
| 2004/0183328 A1 * | 9/2004 | Daniel | | B60N 2/3031 296/65.03 |
| 2004/0212237 A1 * | 10/2004 | Epaud | | B60N 2/065 297/331 |
| 2004/0256900 A1 * | 12/2004 | Kammerer | | B60N 2/06 297/344.15 |
| 2009/0189408 A1 * | 7/2009 | DeVoss | | B60N 2/3079 296/65.08 |
| 2010/0007167 A1 * | 1/2010 | Ito | | B60N 2/3075 296/66 |
| 2011/0221239 A1 * | 9/2011 | Holdampf | | B60N 2/2356 297/61 |
| 2013/0001999 A1 * | 1/2013 | Sasaki | | B60N 2/22 297/378.1 |
| 2013/0328370 A1 * | 12/2013 | Wilfer | | B60N 2/065 297/257 |
| 2014/0183920 A1 * | 7/2014 | Hage-Hassan | | B60N 2/36 297/378.1 |
| 2015/0021958 A1 * | 1/2015 | Fukutani | | B60N 2/06 297/16.1 |
| 2016/0046210 A1 * | 2/2016 | Nakamura | | B60N 2/065 297/344.1 |
| 2016/0137105 A1 * | 5/2016 | Akutsu | | B60N 2/06 297/341 |
| 2016/0144748 A1 * | 5/2016 | Akutsu | | B60N 2/06 297/341 |
| 2017/0225595 A1 * | 8/2017 | Ikawa | | B60N 2/309 |
| 2017/0253147 A1 | 9/2017 | Fukutani et al. | | |
| 2017/0274800 A1 * | 9/2017 | Hansen | | B60N 2/3065 |
| 2017/0313215 A1 * | 11/2017 | Akutsu | | B60N 2/3075 |
| 2018/0186252 A1 | 7/2018 | Akutsu et al. | | |
| 2018/0244176 A1 * | 8/2018 | Matsui | | B60N 2/3075 |

FOREIGN PATENT DOCUMENTS

| | | |
|---|---|---|
| JP | 2015-000624 A | 1/2015 |
| JP | 2015-020600 A | 2/2015 |
| JP | 2015-174472 A | 10/2015 |
| JP | 2016-088480 A | 5/2016 |
| JP | 2016-088483 A | 5/2016 |
| JP | 2016-107881 A | 6/2016 |
| JP | 2017-056816 A | 3/2017 |
| WO | 2014/168233 A1 | 10/2014 |

\* cited by examiner

FRONT ←—————→ REAR

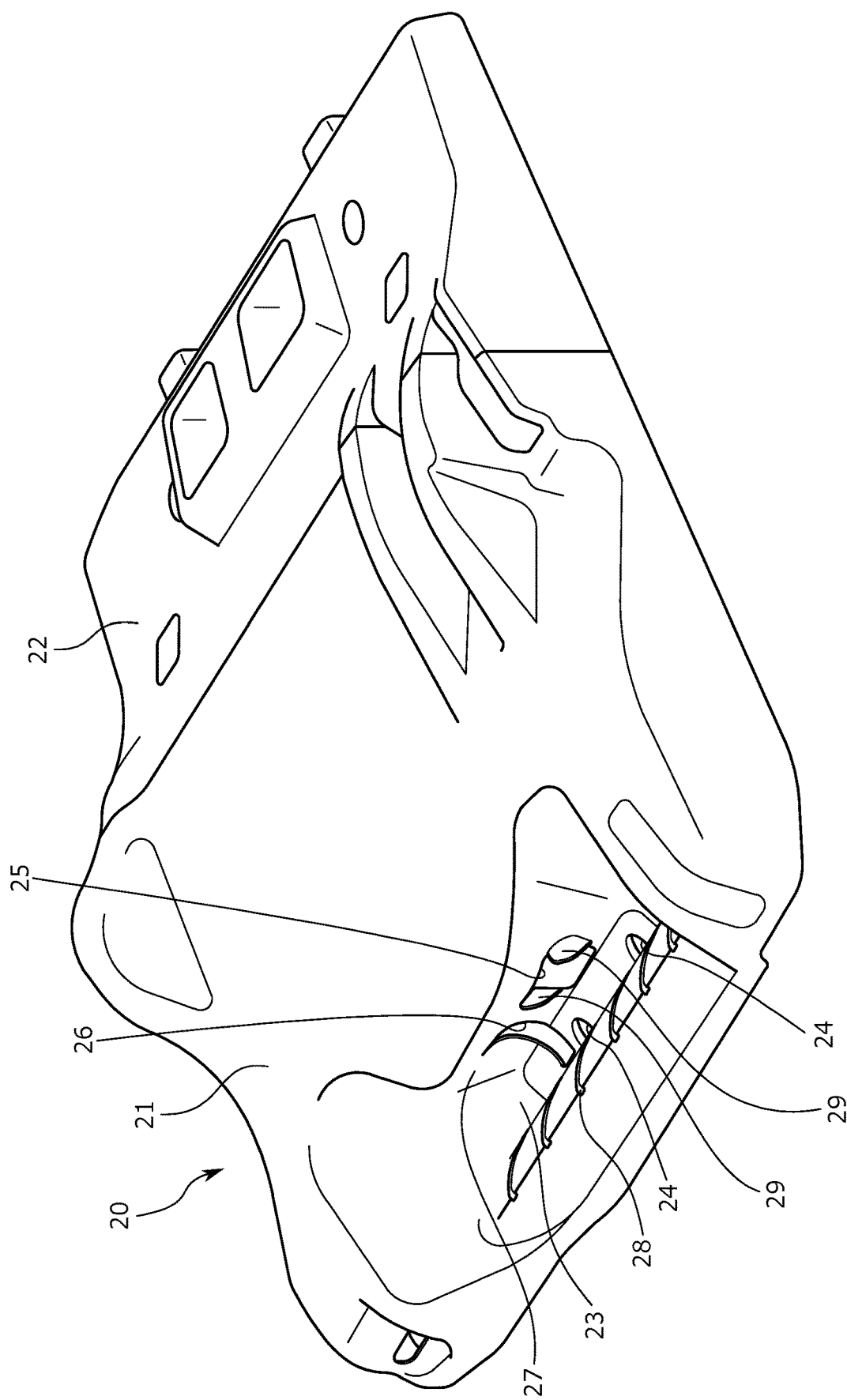

CONVEYANCE SEAT

CROSS REFERENCE TO RELATED APPLICATIONS

This application is based upon and claims the priority benefit of Japanese Patent Application No. JP 2017-166048, filed Aug. 30, 2017, the contents being incorporated herein by reference.

BACKGROUND

The present disclosure relates to a conveyance seat, and particularly, to a conveyance seat including a leg member attached to a lower end portion of a seat main body and movable along with the seat main body and a leg holding member elastically deformable to hold a holding target portion of the leg member.

Among conveyance seats, there is known a seat including a seat main body which is movable to be folded and a leg member that is attached to a lower end portion of the seat main body and is movable along with the seat main body. Such a seat generally includes a leg holding member. The leg holding member is used to hold the leg member when the seat main body is located at a use position (a seating possible position) and is fixed to, for example, a base member or a cover member fixed to a vehicle body floor.

Further, the leg holding member is formed by a resin molded product or metal member having elasticity and holds the leg member by an elastic force. As a detailed example, in a vehicle seat described in WO 2014/168233 A, a plate spring having a substantially circular-arc shape (specifically, an Omega-like shape) formed by folding back both ends in a substantially V-shape forms a leg holding member (an "engagement portion" in WO 2014/168233 A).

The leg member is formed by bending a pipe. Then, a part (hereinafter, a holding target portion) of the leg member formed by the pipe is fitted to the circular-arc portion (hereinafter, a fitting portion) of the leg holding member formed by the plate spring. At this time, the fitting portion holds the holding target portion of the leg member to be elastically deformed. Accordingly, the holding target portion of the leg member is appropriately held by the elastic force of the leg holding member. Further, the holding target portion is removed from the fitting portion with the fitting portion being elastically deformed again in a state in which the holding target portion is fitted to the fitting portion. Accordingly, the leg member can be removed from the leg holding member.

Incidentally, in the configuration according to WO 2014/168233 A, when the holding target portion of the leg member is fitted to the fitting portion of the leg holding member or the holding target portion is removed from the fitting portion, the holding target portion passes through an introduction opening to the fitting portion formed in the leg holding member. At this time, since the holding target portion is brought into contact with an edge portion of the introduction opening in the leg holding member, the leg holding member is elastically deformed so that the introduction opening is pressed and widened. At this time, such a configuration in which the deformation amount of the leg holding member does not increase more than necessary is desirable.

SUMMARY

The present disclosure has been made in view of the above-described problems and an object of the present disclosure is to provide a conveyance seat configured to prevent a leg holding member from being deformed more than necessary.

In an embodiment of a conveyance seat according to the present disclosure, the above-described problems are solved by a conveyance seat including: a seat main body which is movable between a use position and a non-use position; a leg member that is attached to a lower end portion of the seat main body and is movable along with the seat main body; a leg holding member that is elastically deformable to hold a holding target portion of the leg member, the leg holding member including a first portion and a second portion which are separated from each other and configured to hold the holding target portion having passed through an introduction opening of the leg holding member formed between the first portion and the second portion with the holding target portion interposed between the first portion and the second portion when the leg member moves along with the seat main body moving toward the use position; and a deformation amount restriction portion which restricts a deformation amount generated when the leg holding member is elastically deformed so that the second portion is separated from the first portion when the holding target portion passes through the introduction opening.

According to the conveyance seat of the embodiment of the present disclosure with the above-described configuration, the leg holding member is elastically deformed so that the second portion of the leg holding member is separated from the first portion when the holding target portion of the leg member passes through the introduction opening formed in the leg holding member. Since the deformation amount at this time is restricted by the deformation amount restriction portion, it is possible to prevent the leg holding member from being elastically deformed more than necessary.

Further, in the above-described conveyance seat, the deformation amount restriction portion may be provided at a position adjacent to the leg holding member. In the above-described configuration, since the deformation amount restriction portion is disposed at a position adjacent to the leg holding member, the deformation amount restriction portion can be provided with a more compact configuration.

Further, in the above-described conveyance seat, the deformation amount restriction portion may include a first deformation amount restriction portion and a second deformation amount restriction portion which are disposed to be separated from each other, and the leg holding member may be disposed between the first deformation amount restriction portion and the second deformation amount restriction portion. In the above-described configuration, since the plurality of deformation amount restriction portions (the first deformation amount restriction portion and the second deformation amount restriction portion) are provided to be separated from each other, the deformation amount of the leg holding member can be more effectively restricted. Further, according to the above-described configuration, the leg holding member can be disposed through the effective use of a space between the deformation amount restriction portions.

Further, the above-described conveyance seat may further include a cover member that covers at least a portion of the leg holding member with the leg holding member attached to the cover member and the deformation amount restriction portion may be formed by a portion of the cover member. In the above-described configuration, since the deformation amount restriction portion is provided integrally with the cover member, it is possible to decrease the number of components compared to a case in which the deformation amount restriction portion is provided separately from the cover member.

Further, in the above-described conveyance seat, the leg holding member may be attached to the cover member with the first portion and the second portion being exposed, the cover member may be provided with an accommodation space configured to accommodate the holding target portion held by the leg holding member, the first portion and the second portion may be accommodated to be exposed in the accommodation space with the leg holding member attached to the cover member, and the deformation amount restriction portion may be formed by a protrusion portion that protrudes toward a side in which the second portion is located inside the accommodation space in the cover member. In the above-described configuration, the protrusion portion provided in the cover member forms the deformation amount restriction portion. According to such a configuration, the deformation amount restriction portion can be formed with a simpler configuration.

Further, in the above-described conveyance seat, the cover member may be provided with a through-hole formed to attach the leg holding member to the cover member, and the protrusion portion may be provided at an edge portion of the through-hole in the cover member. In the above-described configuration, the protrusion portion serving as the deformation amount restriction portion is provided at the edge portion of the through-hole in the cover member. Accordingly, it is possible to reinforce the periphery of the through-hole of which the strength is decreased due to the through-hole formed in the cover member by the protrusion portion. Further, since the protrusion portion is provided at the edge portion of the through-hole, it is possible to prevent foreign matter from entering the through-hole.

Further, in the above-described conveyance seat, the cover member may be provided with a fixed portion configured to fix the cover member to a vehicle body and the protrusion portion may be provided at a position different from the fixed portion in a width direction of the seat main body. According to the above-described configuration, since the protrusion portion is provided at a position different from the fixed portion in the seat width direction, it is possible to prevent the interference between the protrusion portion and the fixed portion.

Further, in the above-described conveyance seat, the cover member may include a plurality of fixed portions that includes the fixed portion and the protrusion portion may be disposed between the fixed portions in the width direction. According to the above-described configuration, the protrusion portion can be provided through the effective use of a space between the plurality of fixed portions. Further, the protrusion portion can appropriately restrict the deformation amount of the leg holding member while preventing the interference between the protrusion portion and the fixed portions.

Further, in the above-described conveyance seat, the protrusion portion may include a flange portion formed by bending a distal end portion of the protrusion portion and the flange portion is brought into contact with a portion adjacent to the second portion in the leg member to restrict the deformation amount. In the above-described configuration, the flange portion formed at the distal end portion of the protrusion portion is brought into contact with a portion adjacent to the second portion of the leg holding member in the leg member to restrict the deformation amount of the leg holding member. In this way, when the flange portion is formed by bending a portion contacting the leg member in the protrusion portion, an area contacting the leg member increases and thus the flange portion more appropriately is brought into contact with the leg member. As a result, the protrusion portion can more appropriately restrict the deformation amount of the leg holding member.

Further, in the above-described conveyance seat, the cover member may include a projection portion which is projected to face the holding target portion at a position above the holding target portion held by the leg holding member, the deformation amount restriction portion may include a first deformation amount restriction portion and a second deformation amount restriction portion which are disposed to be separated from each other, the first deformation amount restriction portion may be provided at a central portion of the projection portion in a width direction of the seat main body, and the second deformation amount restriction portion may be provided at a position adjacent to an end portion of the projection portion in relation to the central portion of the projection portion in the width direction. According to the above-described configuration, one of the plurality of deformation amount restriction portions (the first deformation amount restriction portion) is provided at the central portion of the projection portion of the cover member in the seat width direction. Further, another deformation amount restriction portion (the second deformation amount restriction portion) is provided at a position adjacent to the end of the projection portion in the seat width direction. Accordingly, the deformation amount restriction portions can be appropriately disposed (specifically, without any interference).

Further, in the above-described conveyance seat, the cover member may include a raised portion which is formed by raising a portion of a surface of the cover member, and the raised portion may be located in front of the holding target portion and face the holding target portion while the holding target portion is held by the leg holding member. In the above-described configuration, the raised portion of the cover member is located in front of the holding target portion and faces the holding target portion with the holding target portion held by the leg holding member. Accordingly, the raised portion of the cover member can be disposed at an appropriate position in terms of the relationship with the holding target portion of the leg member.

Further, the above-described conveyance seat may further include a locking device which is engaged with the holding target portion held by the leg holding member to lock the leg member and the deformation amount restriction portion may be disposed between the locking device and the leg holding member in a width direction of the seat main body. In the above-described configuration, since the deformation amount restriction portion is disposed between the locking device and the leg holding member in the seat width direction, the locking device, the leg holding member, and the deformation amount restriction portion can be provided with a more compact configuration.

According to the conveyance seat of the present disclosure, it is possible to prevent the leg holding member from being deformed more than necessary. Further, according to the conveyance seat of the present disclosure, the deformation amount restriction portion can be provided with a more compact configuration. Further, according to the conveyance seat of the present disclosure, the leg holding member can be disposed through the effective use of a space between the deformation amount restriction portions. Further, according to the conveyance seat of the present disclosure, since the deformation amount restriction portion is formed integrally with the cover member, the number of components further decreases. Further, according to the conveyance seat of the present disclosure, since the protrusion portion provided in the cover member forms the deformation amount restriction portion, the deformation amount restriction portion can be provided with a simpler configuration. Further, according to the conveyance seat of the present disclosure, the periphery of the through-hole of which the strength is decreased due to the through-hole formed in the cover member is reinforced by the protrusion portion. Further, since the protrusion portion is provided at the edge portion of the through-hole, it is possible to prevent foreign matter from entering the through-hole. Further, according to the conveyance seat of the present disclosure, the interference between the protrusion portion and the fixed portion can be prevented. Further, according to the conveyance seat of the present disclosure, the protrusion portion can be provided through the effective use of a space between the fixed portions. Further, the protrusion portion can appropriately restrict the deformation amount of the leg holding member while preventing the interference between the protrusion portion and the fixed portions. Further, according to the conveyance seat of the present disclosure, since the flange portion formed at the distal end portion of the protrusion portion is brought into contact with the leg member, an area in which the leg member contacts the protrusion portion increases and thus the protrusion portion more appropriately is brought into contact with the leg member. As a result, the protrusion portion can more appropriately restrict the deformation amount of the leg holding member. Further, according to the conveyance seat of the present disclosure, each of the plurality of deformation amount restriction portions can be appropriately disposed. Further, according to the conveyance seat of the present disclosure, the raised portion of the cover member can be disposed at an appropriate position in terms of the relationship with the holding target portion of the leg member. Further, according to the conveyance seat of the present disclosure, the locking device, the leg holding member, and the deformation amount restriction portion can be provided with a more compact configuration.

BRIEF DESCRIPTION OF THE DRAWINGS

Various embodiments of the invention are illustrated in the drawings, in which:

FIG. 8 is a perspective view of a cover member;

DETAILED DESCRIPTION

Hereinafter, a configuration example of a conveyance seat according to an embodiment of the present disclosure (the present embodiment) is described. In the description below, a vehicle seat is described as an example of the conveyance seat and only a configuration example thereof is described. Here, the present disclosure can be also applied to a conveyance seat other than the vehicle seat, for example, a seat mounted on a ship or airplane.

In the description below, a "front to back direction" indicates a front to back direction of a seat main body described below and a direction corresponding to a vehicle traveling direction. Further, a "seat width direction" indicates a width direction of a seat main body Sh described below and a direction corresponding to a right and left direction when viewed from an occupant sitting on the vehicle seat. Further, an "up and down direction" indicates an up and down direction of the vehicle seat and a direction matched with a vertical direction when the vehicle travels on a horizontal plane. Further, a "front view" indicates a state in which the vehicle seat or vehicle seat components is viewed from the front of the vehicle seat.

Additionally, the shape, position, and posture of the seat described below is described by assuming a case in which the vehicle seat is in use (in a case in which the vehicle seat is in a seating possible state and each portion of the seat is disposed at a seating possible position) unless otherwise noted.

Basic Configuration of Vehicle Seat according to Present Embodiment

Figure 1:
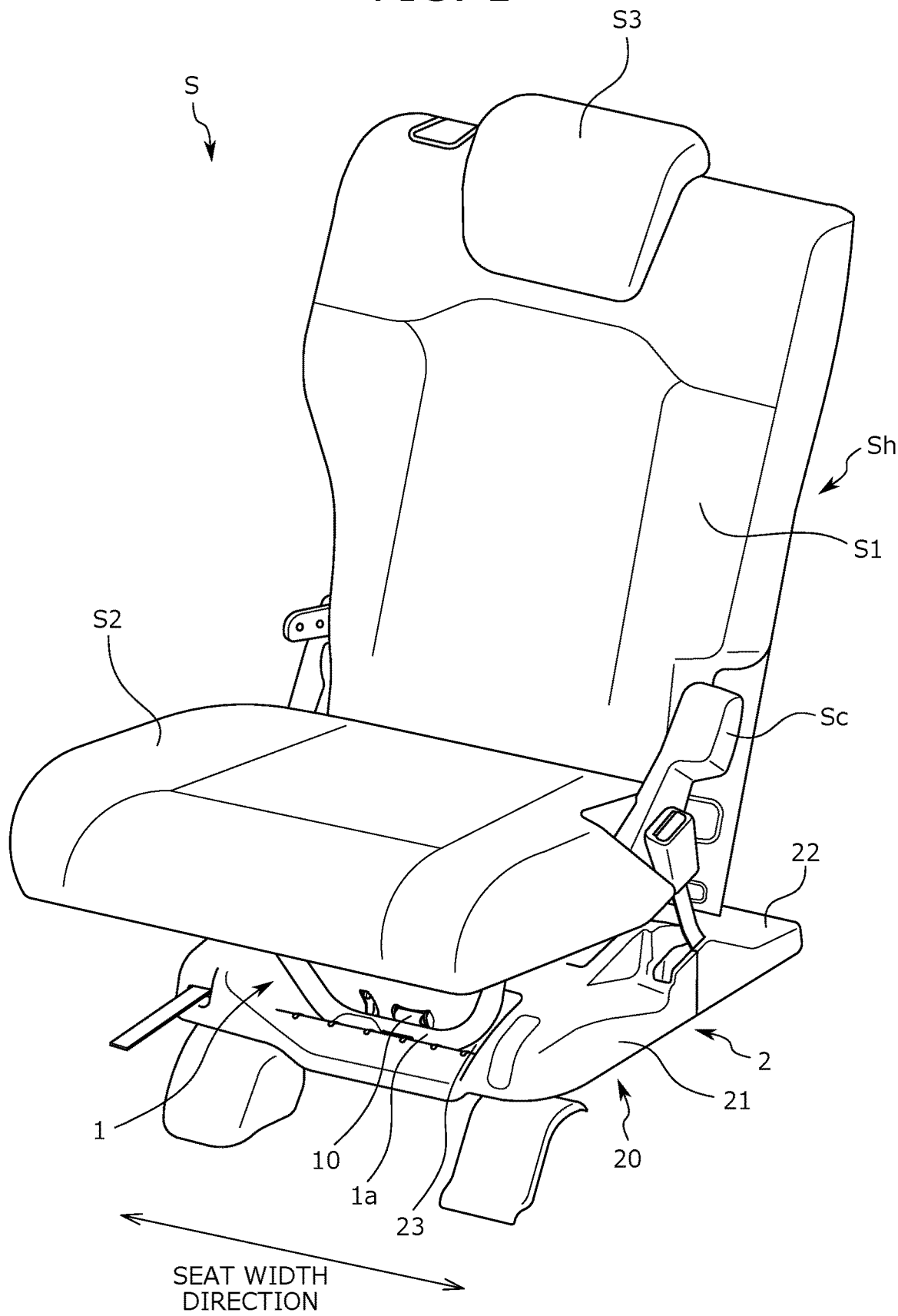
FIG. 1 is a perspective view of a conveyance seat according to an embodiment of the present disclosure.
Figure 2:
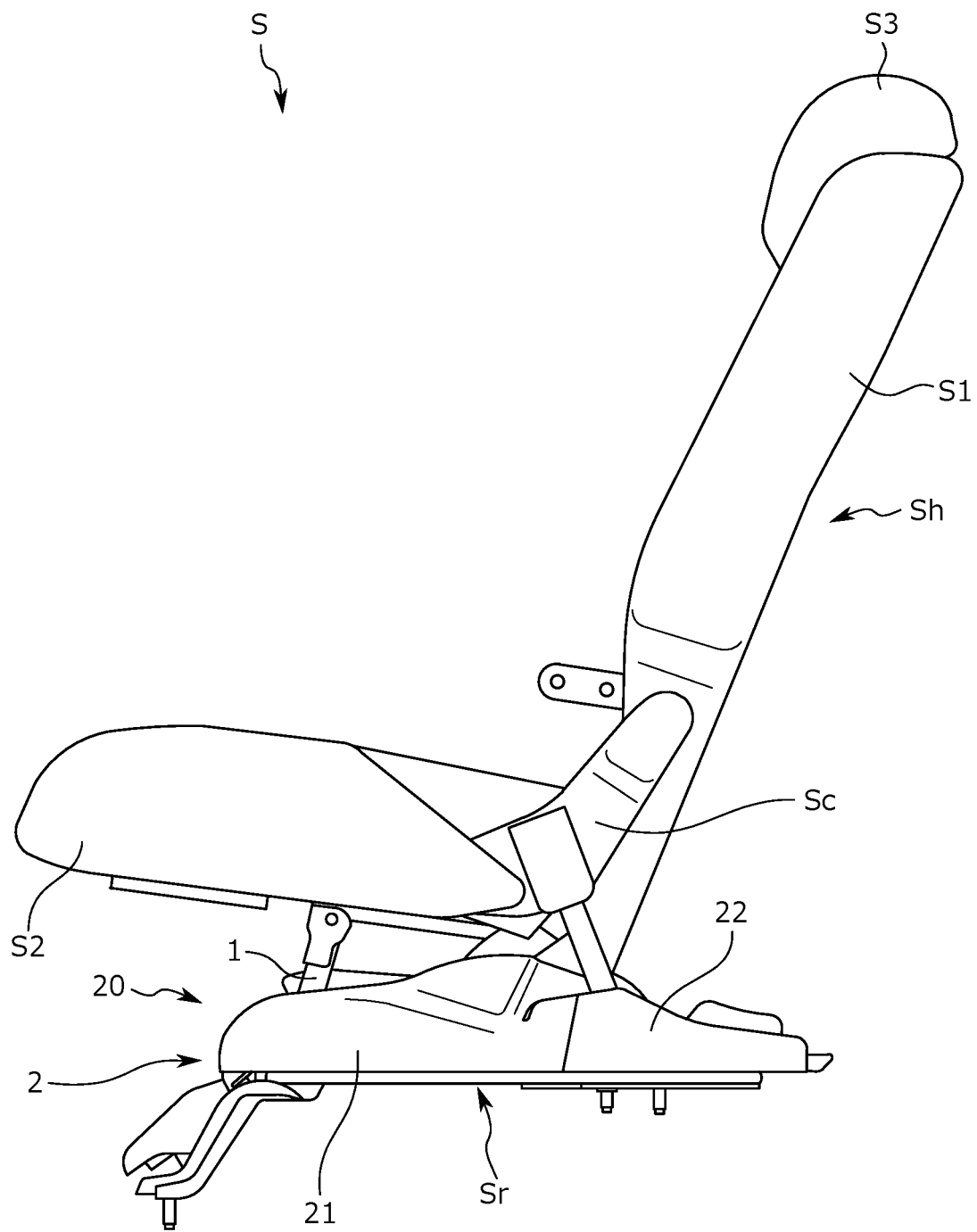
FIG. 2 is a side view of the conveyance seat according to the embodiment of the present disclosure.
Figure 3:
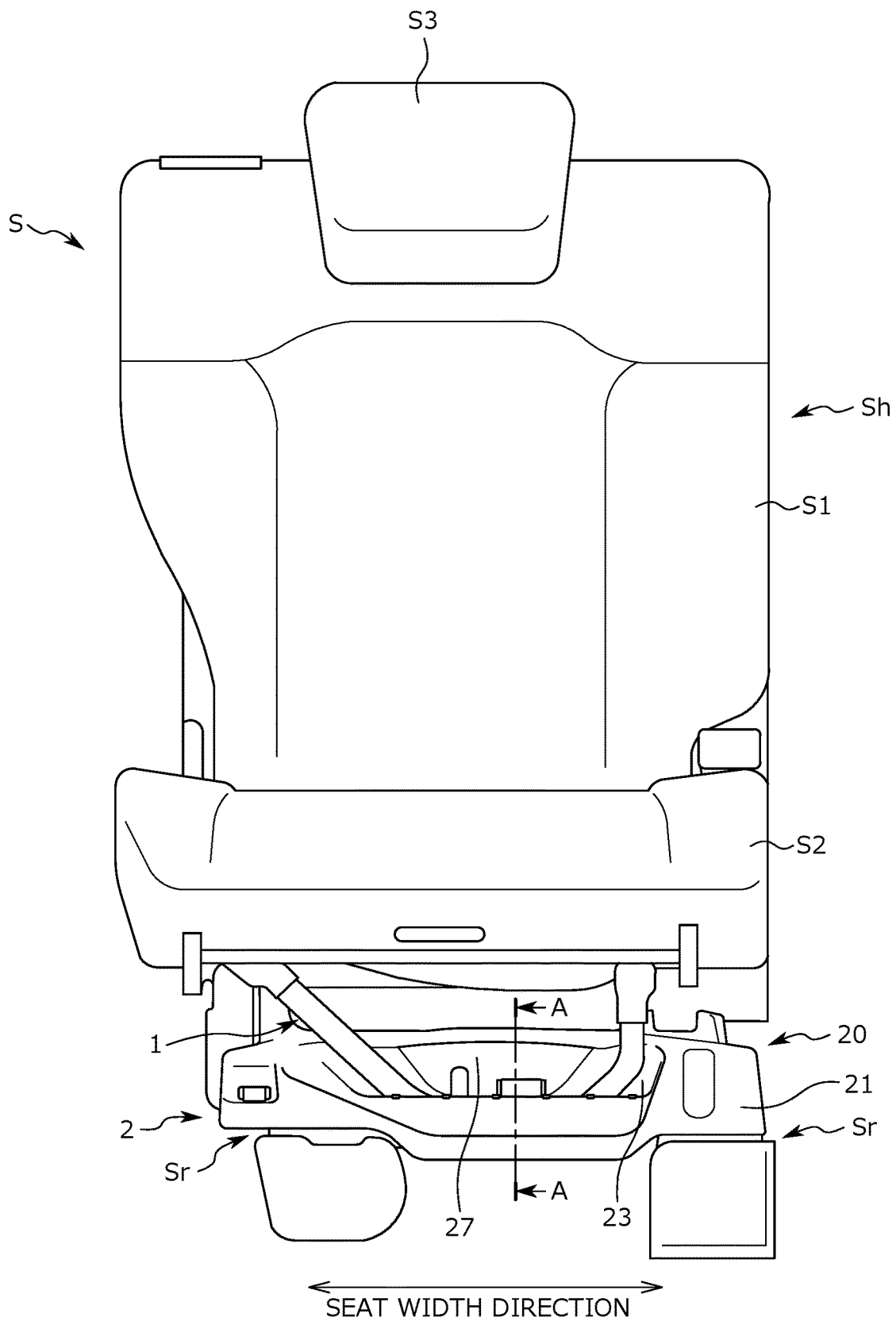
FIG. 3 is a front view of the conveyance seat according to the embodiment of the present disclosure.
Figure 4:
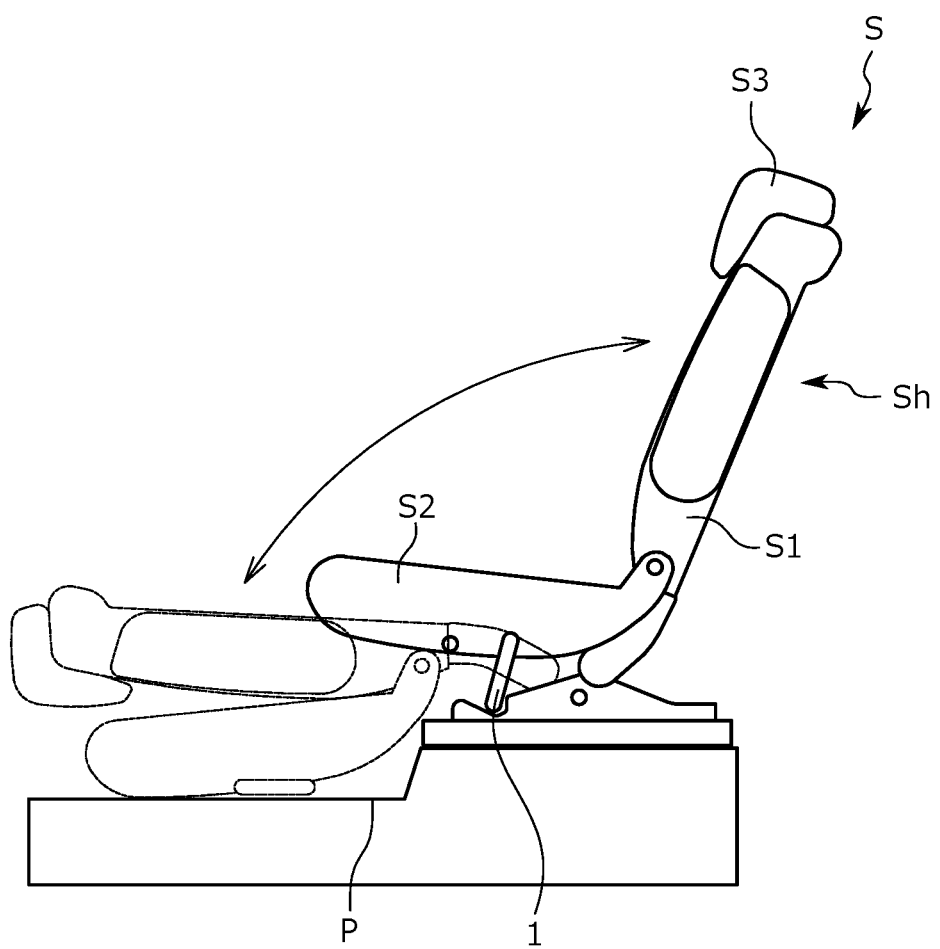
FIG. 4 is an explanatory diagram for an operational example of the conveyance seat according to the embodiment of the present disclosure.
Figure 5:
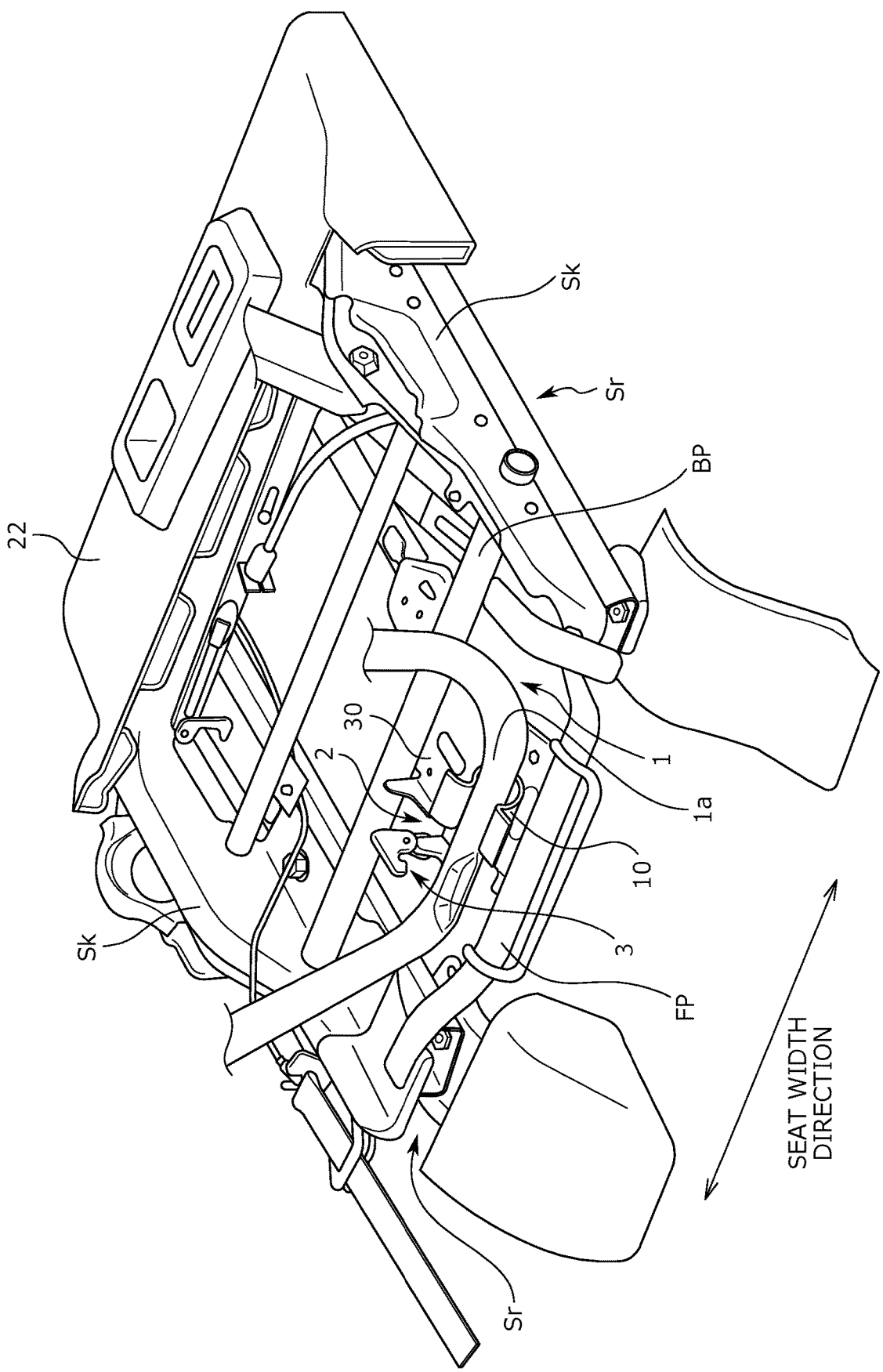
FIG. 5 is a diagram illustrating a lower structure of the conveyance seat according to the embodiment of the present disclosure.

A basic configuration of a vehicle seat (hereinafter, a vehicle seat S) according to the present embodiment is described with reference to FIGS. 1 to 5. FIGS. 1 to 3 are diagrams illustrating the vehicle seat S, where FIG. 1 is a perspective view, FIG. 2 is a side view, and FIG. 3 is a plan view. FIG. 4 is an explanatory diagram for an operational example of the vehicle seat S. In these drawings, a state in which the seat main body Sh of the vehicle seat S is located at a use position is indicated by a solid line and a state in which the seat main body Sh is located at a stowed position is indicated by a dashed line. FIG. 5 is a diagram illustrating a lower structure of the vehicle seat S and is a diagram illustrating a state in which a portion located below the seat main body Sh in the vehicle seat S is viewed while a front cover 21 described below is removed.

The vehicle seat S is used as a rear seat of the vehicle and can be seated by an occupant in a normal state. Further, the vehicle seat S can be stowed while being inclined toward a vehicle body floor in a non-use state. That is, the vehicle seat S is a movable seat configured to perform a so-called dive-down operation.

The vehicle seat S includes, as illustrated in FIGS. 1, 2, and 3, the seat main body Sh and slide rail mechanisms Sr. The seat main body Sh is a portion on which an occupant sits in the vehicle seat S and includes a seat back S1 and a seat cushion S2. The slide rail mechanisms Sr are provided as a pair of slide rails at the right and left sides and slides the seat main body Sh in the front to back direction by the cooperation thereof. As the slide rail mechanisms Sr, known slide rail mechanisms can be used.

The seat main body Sh is described. The seat back S1 of the seat main body Sh includes, as illustrated in FIG. 1, a headrest S3 provided at the upper portion thereof. A lower end portion of the seat back S1 is supported by the slide rail mechanisms Sr via seat support brackets Sk. The lower end portion of the seat back S1 is attached to the seat support brackets Sk to be rotatable so that the seat back can move (rotate) to be inclined forward or backward. For example, the seat back S1 is inclined forward from the use position and is folded until a rear surface (a back surface) of the seat back S1 finally is substantially horizontal as illustrated in FIG. 4. Here, the "use position" indicates a position in which the seat main body Sh is in a seating possible state.

The seat cushion S2 is attached to the seat back S1 via a connection member Sc having a substantially L-shape in side view. More specifically, a rear end portion of the seat cushion S2 is attached to a front end portion of the connection member Sc and a rear end portion of the connection member Sc is attached to a substantially central portion of a side end portion of the seat back S1 in the up and down direction. Further, the rear end portion of the connection member Sc can rotate relative to the seat back S1 about a shaft (a rotation shaft) extending in the seat width direction. Then, when the rear end portion of the connection member Sc rotates, the seat cushion S2 rotates integrally with the rear end portion of the connection member Sc. Through such a rotation operation, the seat cushion S2 rotates in such a direction to move close to the seat back S1 from the use position. Finally, as illustrated in FIG. 4, the seat cushion S2 and the seat back S1 overlap each other (in a folded state).

By the above-described operation of the seat back S1 and the seat cushion S2, the seat main body Sh can move from the use position (a position of the vehicle seat S indicated by a solid line in the drawing) illustrated in FIG. 4 to the stowed position (a position of the vehicle seat S indicated by a dashed line in the drawing). In contrast, the seat main body Sh located at the stowed position can be returned to the use position. Here, the stowed position corresponds to a "non-use position" and is located at the front side in relation to the use position as illustrated in FIG. 4.

Additionally, in the present embodiment, a stowage floor P is formed at a portion located just in front of the vehicle seat S in the vehicle body floor. The stowage floor P is formed with a portion of the vehicle body floor recessed by one step from the surroundings thereof. In a state in which the vehicle seat S is located at the stowed position (that is, in the stowed state), the seat cushion S2 overlapping the seat back S1 is placed in a recessed space provided in the stowage floor P as illustrated in FIG. 4.

The configuration of the vehicle seat S is now described again. The vehicle seat S includes a leg member 1, a leg holding mechanism 2, and a locking device 3 in addition to the seat main body Sh and the slide rail mechanisms Sr as illustrated in FIGS. 1, 2, 3, and 5.

The leg member 1 is formed by bending a metal pipe in a substantially U-shape and is attached to a lower end portion of the seat main body Sh, specifically, a lower end portion of the seat cushion S2. The leg member 1 supports the seat cushion S2 from below when the seat main body Sh is located at the use position as illustrated in FIG. 4. At this time, the leg member 1 itself is held by the leg holding mechanism 2 to stand on the vehicle body floor. Additionally, the standing leg member 1 is inclined with respect to the seat cushion S2 to be located forward (separated from the seat back S1) toward a lower end (an end separated from the seat cushion S2) thereof as illustrated in FIG. 4.

Further, the leg member 1 can move (rotate) along with the seat cushion S2 when the seat cushion S2 moves. In addition, the leg member 1 is assembled to the seat cushion S2 through the rotation shaft extending in the seat width direction and is relatively rotatable about the rotation shaft with respect to the seat cushion S2. Accordingly, at the time of accommodating the seat, the leg member 1 moves along with the seat cushion S2 and relatively rotates with respect to the seat cushion S2 so that the leg member is finally folded to overlap the seat cushion S2 as illustrated in FIG. 4.

Further, at the time of returning the vehicle seat S to the use state, the folded leg member 1 is rotated and unfolded to be separated from the seat cushion S2. Then, the unfolded leg member 1 stands up with respect to the seat cushion S2 and stands on the vehicle body floor when the seat cushion S2 is located at the use position, thereby supporting the seat cushion S2 from below.

The leg holding mechanism 2 forms a portion of a base portion of the vehicle seat S and holds the unfolded leg member 1 when the seat cushion S2 is located at the use position. Specifically, when the seat main body Sh is located at the use position, the leg holding mechanism 2 holds the holding target portion 1*a* by gripping the holding target portion 1*a* of the unfolded leg member 1 as illustrated in FIG. 1. Here, the holding target portion 1*a* corresponds to the lower end portion of the unfolded leg member 1 (in other words, a portion connecting the side portions of the leg member 1) and extends elongated in the seat width direction.

Further, the leg holding mechanism 2 includes a leg holding member 10 illustrated in FIG. 5 and a cover member 20 illustrated in FIG. 1 and the like. The leg holding member 10 is a resilient member, specifically, a metallic plate spring provided to hold the unfolded leg member 1. The cover member 20 covers the slide rail mechanisms Sr and covers to protect a portion of the leg holding member 10 and is formed by, in the present embodiment, a resin molded product.

All of the leg holding member 10 and the cover member 20 are located below the seat main body Sh and are fixed on the vehicle body floor. In addition, the leg holding member 10 and the cover member 20 is described in detail below.

Further, the vehicle seat S further includes the locking device 3 illustrated in FIG. 5. The locking device 3 is an inertial locking device and locks the leg member 1 by being engaged with the holding target portion 1*a* of the leg member 1 while the leg holding mechanism 2 holds the leg member 1. Specifically, the locking device 3 includes an engagement hook as illustrated in FIG. 5 and is supported to be rotatable about a support shaft extending in the seat width direction. Then, when the unfolded leg member 1 moves toward a holding position (a position in which the unfolded leg member is held by the leg holding mechanism 2), the locking device 3 is brought into contact with the leg member 1 and is subsequently pressed by the moving leg member 1. As a result, as the leg member 1 approaches the holding position, the locking device 3 rotates about the support shaft so that the engagement hook is engaged with the holding target portion 1a of the leg member 1. Accordingly, the leg member 1 is locked while being held by the leg holding mechanism 2 (specifically, while being held by the leg holding member 10).

Additionally, a portion to be engaged with the locking device 3 in the holding target portion 1a of the leg member 1 is located at a position displaced from a portion held by the leg holding member 10 in the seat width direction as illustrated in FIG. 5. Further, a portion to be engaged with the locking device 3 in the holding target portion 1a of the leg member 1 is a portion in which an outer peripheral portion of the metal pipe forming the leg member 1 is crushed as illustrated in FIG. 5.

Configuration of Leg Holding Member

Figure 6:
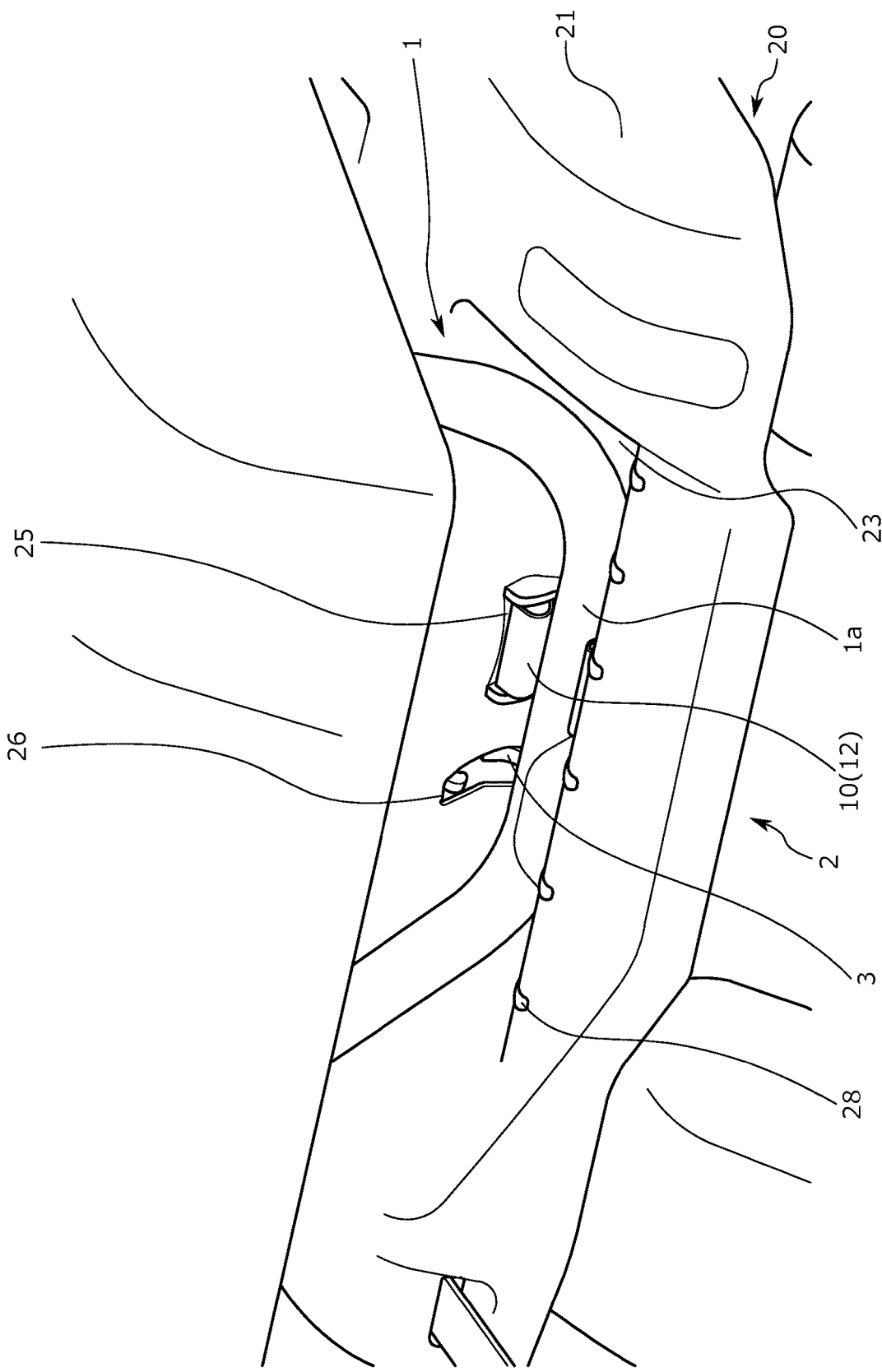
FIG. 6 is a partially enlarged view of FIG. 1.
Figure 7A:
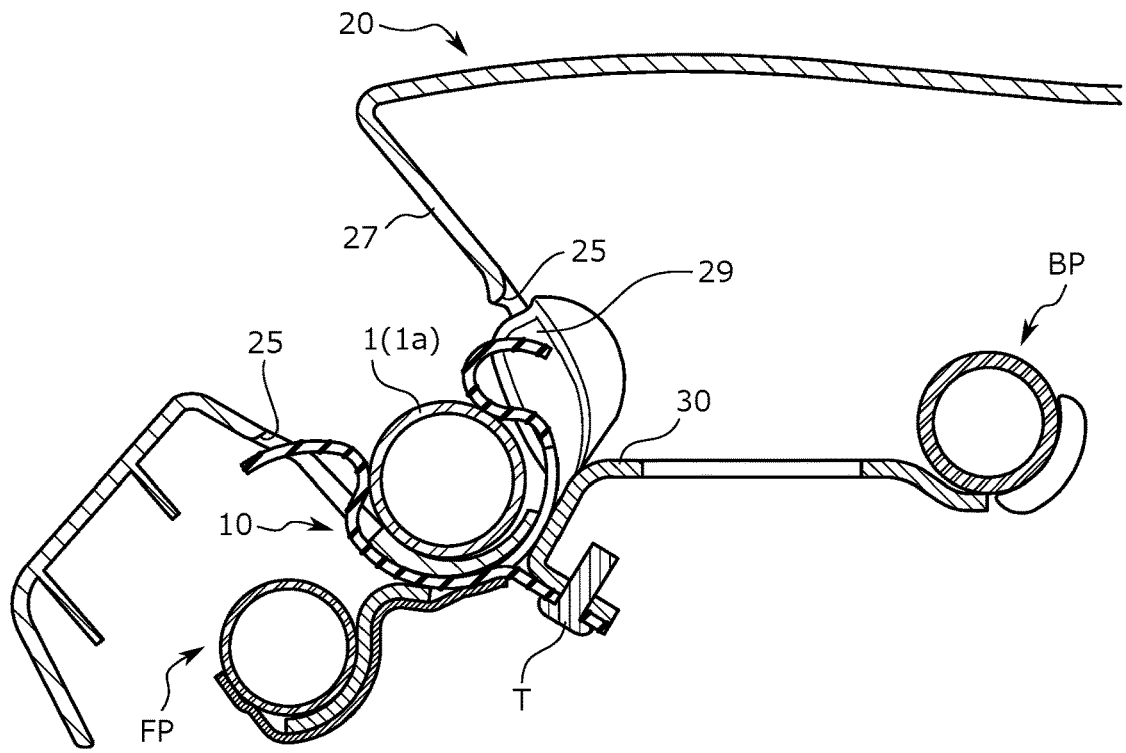
FIG. 7A is a diagram illustrating a cross-section taken along the line A-A of FIG. 3.
Figure 7B:
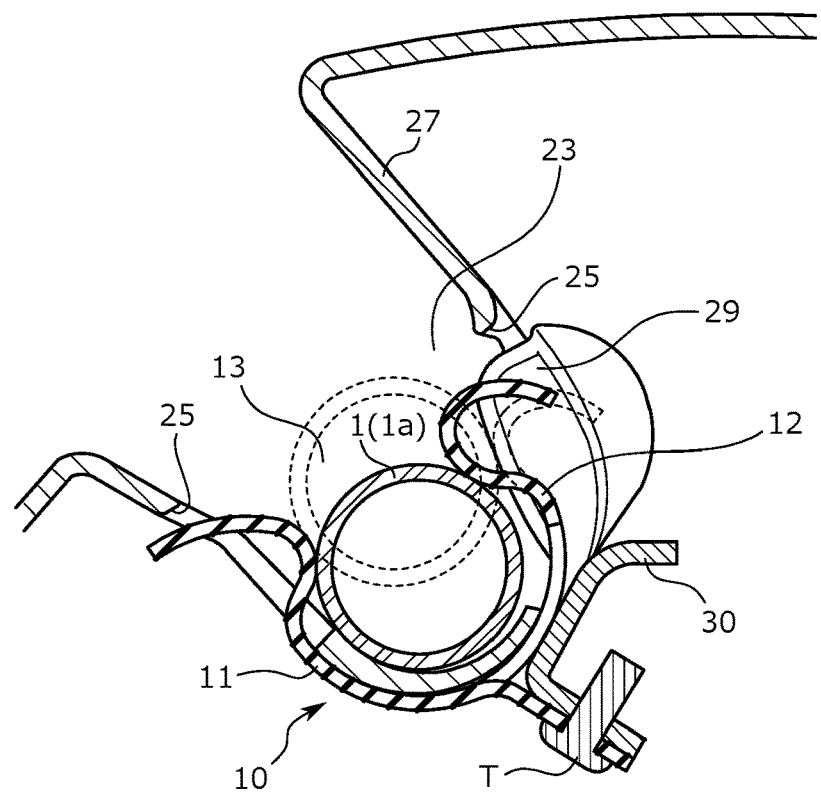
FIG. 7B is a diagram illustrating a state in which a holding target portion of a leg member is held by a leg holding member.

Next, a configuration of the leg holding member 10 is described in detail with reference to FIGS. 5, 6, 7A, and 7B. FIG. 6 is a partially enlarged view of FIG. 1 and is an enlarged view of the holding target portion 1a of the leg member 1 held by the leg holding member 10 and the surroundings thereof. FIG. 7A is a diagram illustrating a cross-section take along the line A-A of FIG. 3. FIG. 7B is a diagram illustrating a state in which the holding target portion 1a is held by the leg holding member 10 and is a diagram illustrating a cross section of the leg holding member 10 and the surroundings thereof, taken along the line A-A of FIG. 3.

The leg holding member 10 is formed by a plate spring which is elastically deformable to hold the holding target portion 1a of the leg member 1 and is curved in a substantially Omega-like (Ω) shape in side view as illustrated in FIG. 7B. That is, the leg holding member 10 includes a C-shaped curved portion and portions which are folded back in a substantially U-shape at positions adjacent to the curved portion. Then, the leg holding member 10 holds the holding target portion 1a with the holding target portion 1a of the leg member 1 fitted to the C-shaped curved portion.

In the present embodiment, the leg holding member 10 is fixed to the vehicle body floor via a leg holding member support bracket 30 as illustrated in FIGS. 5 and 7A. More specifically, as illustrated in FIG. 7A, the leg holding member 10 is fixed to the leg holding member support bracket 30 with a tapping screw T. Further, as illustrated in FIGS. 5 and 7A, two connection pipes (specifically, a first connection pipe BP and a second connection pipe FP) extend between the pair of right and left slide rail mechanisms Sr (specifically, the upper rails of the slide rail mechanisms Sr). Each of the first connection pipe BP and the second connection pipe FP is formed by a hollow pipe extending in the seat width direction and is arranged in parallel in the front to back direction. Then, as illustrated in FIG. 7A, the rear end portion of the leg holding member support bracket 30 is welded to the first connection pipe BP located on the rear side and the front end portion of the leg holding member support bracket 30 is welded to the second connection pipe FP located on the front side. That is, the leg holding member 10 is fixed to the vehicle body floor via the leg holding member support bracket 30 as well as the first connection pipe BP and the second connection pipe FP to which the leg holding member support bracket 30 is welded.

Further, the leg holding member 10 is used while being assembled to the cover member 20. More specifically, the leg holding member 10 protrudes to be exposed from the cover member 20 with a portion of the leg holding member 10 being covered by the cover member 20. The exposed portion of the leg holding member 10 is provided as a set of front and rear portions as illustrated in FIG. 7B and the holding target portion 1a is held while being interposed between the exposed portions of the leg holding member 10.

A structure of the leg holding member 10 is now described again. The leg holding member 10 includes two portions which protrude from the cover member 20 and face each other as illustrated in FIG. 7B. The two portions correspond to the above-described exposed portions and are separated from each other in the front to back direction as illustrated in the same drawing. Hereinafter, a portion located on the front side among the two exposed portions is referred to as a first portion 11 and a portion located on the rear side thereamong is referred to as a second portion 12. However, the present disclosure is not limited thereto. For example, the portion located on the rear side may be referred to as the first portion 11 and the portion located on the front side may be referred to as the second portion 12.

Further, as illustrated in FIG. 7B, a gap is formed between the distal end portions (the free end portions) of the first portion 11 and the second portion 12. This gap forms an introduction opening 13 through which the holding target portion 1a of the leg member 1 can pass. The width (the width in the front to back direction) of the introduction opening 13 is slightly shorter than the outer diameter of the metal plate forming the leg member 1. For this reason, the holding target portion 1a presses and widens the introduction opening 13 when the holding target portion 1a of the leg member 1 passes through the introduction opening 13. In other words, when the holding target portion 1a passes through the introduction opening 13, the leg holding member 10 receives a contact force from the holding target portion 1a and is elastically deformed so that the second portion 12 is separated from the first portion 11. That is, as illustrated in FIG. 7B, the second portion 12 is pressed backward by the holding target portion 1a of the leg member 1 to be displaced to a position indicated by a dashed line of FIG. 7B.

Then, when the holding target portion 1a passes through the introduction opening 13 into the leg holding member 10, the holding target portion 1a is held by an elastic force of the leg holding member 10. More specifically, the holding target portion 1a, having passed through the introduction opening 13, is placed between the first portion 11 and the second portion 12 in the front to back direction. At this time, an elastic force tending to move the second portion 12 toward the first portion 11 is applied to the leg holding member 10. For this reason, the holding target portion 1a is fitted between the first portion 11 and the second portion 12. Additionally, the holding target portion 1a which is held by the leg holding member 10 is in contact with the first portion 11 and the second portion 12 and is in contact with a bottom surface of an accommodation recess 23 described below in the cover member 20 as illustrated in FIG. 7B. That is, the leg member 1 is positioned in such a manner that the holding target portion 1a is in contact with the three positions while the leg member 1 is held by the leg holding member 10.

According to the above-described configuration, when the leg member 1 moves along with the seat cushion S2 moving toward the use position, the holding target portion 1a passes through the introduction opening 13 and then the holding target portion 1a is held between the first portion 11 and the second portion 12. As a result, the holding target portion 1a of the leg member 1 is held by the leg holding member 10.

Further, the holding target portion 1a held by the leg holding member 10 can be removed from the leg holding member 10. Specifically, when the seat cushion S2 moves toward the seat back S1, in accordance with this movement, the leg member 1 moves in such direction in which the leg member 1 is removed from the leg holding member 10. At this time, the holding target portion 1a presses and widens the introduction opening 13 and passes through the introduction opening 13. In other words, when the holding target portion 1a passes through the introduction opening 13, the leg holding member 10 receives a contact force from the holding target portion 1a and is elastically deformed again so that the second portion 12 is separated from the first portion 11.

Then, the holding target portion 1a passes through the introduction opening 13 and reaches the outside of the leg holding member 10, so that the leg member 1 is removed from the leg holding member 10. In this way, when the leg member 1 moves along with the seat cushion S2 moving toward the stowed position, the holding target portion 1a is removed from the gap between the first portion 11 and the second portion 12, passes through the introduction opening 13, and finally reaches the outside of the leg holding member 10.

Configuration of Cover Member

Figure 9:
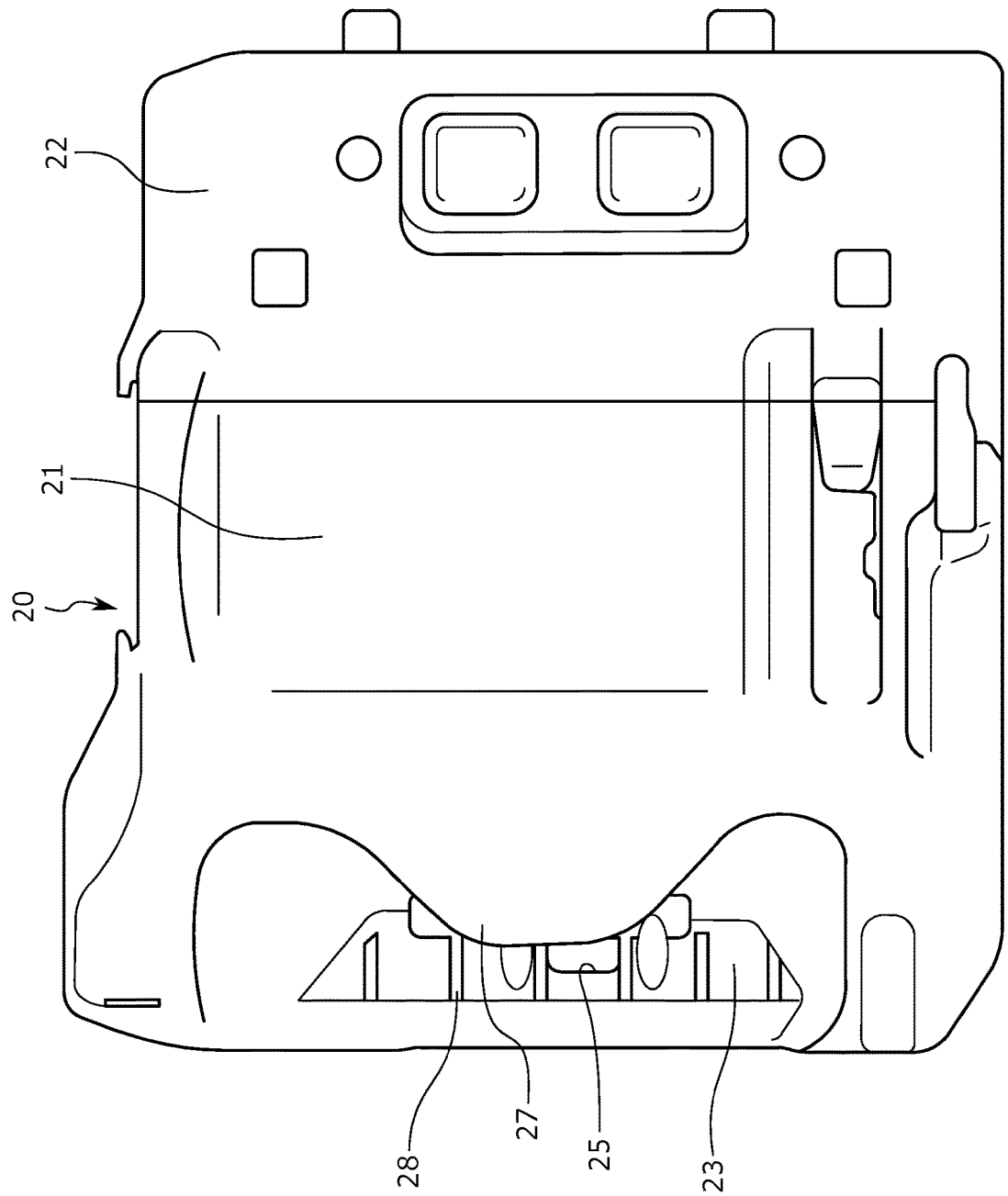
FIG. 9 is a plan view of the cover member.
Figure 10:
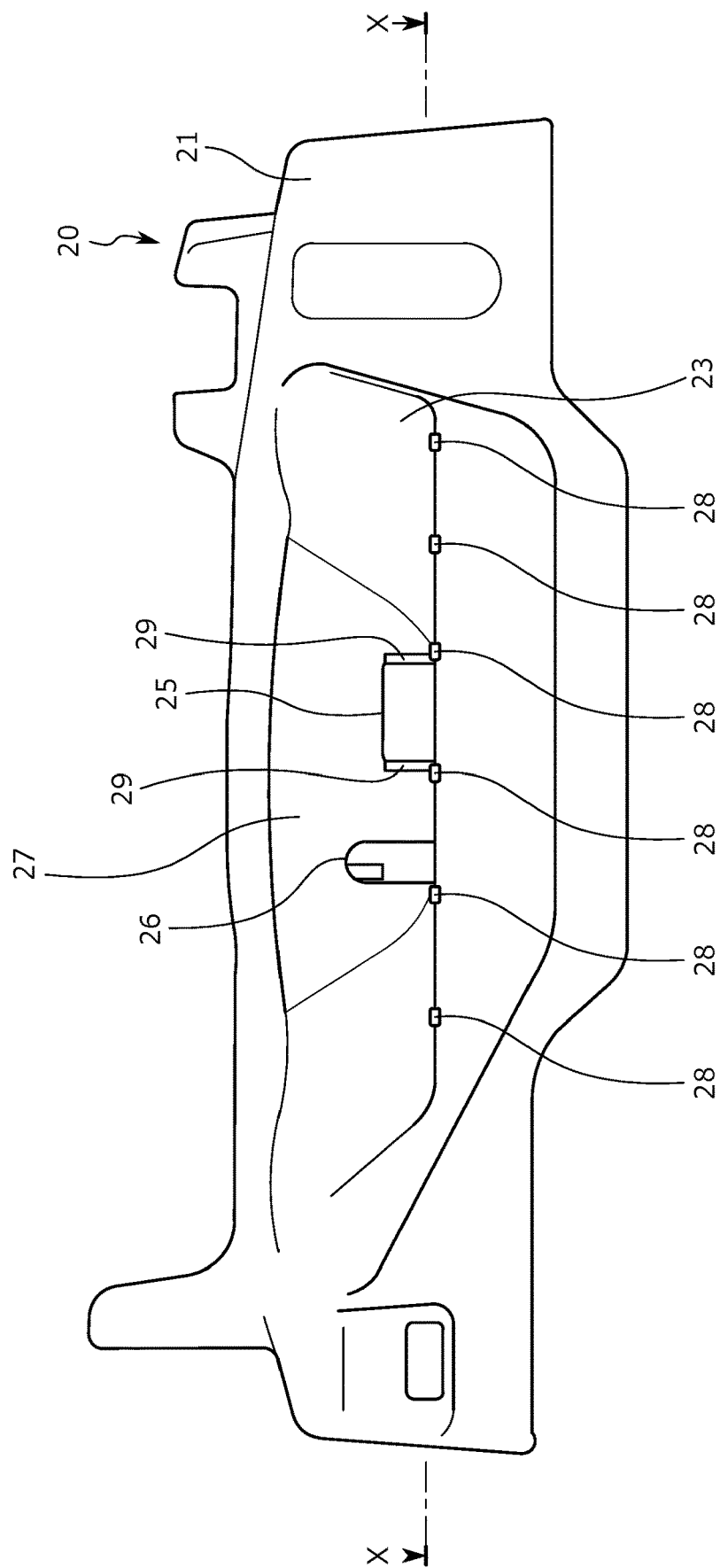
FIG. 10 is a front view of the cover member.
Figure 11:
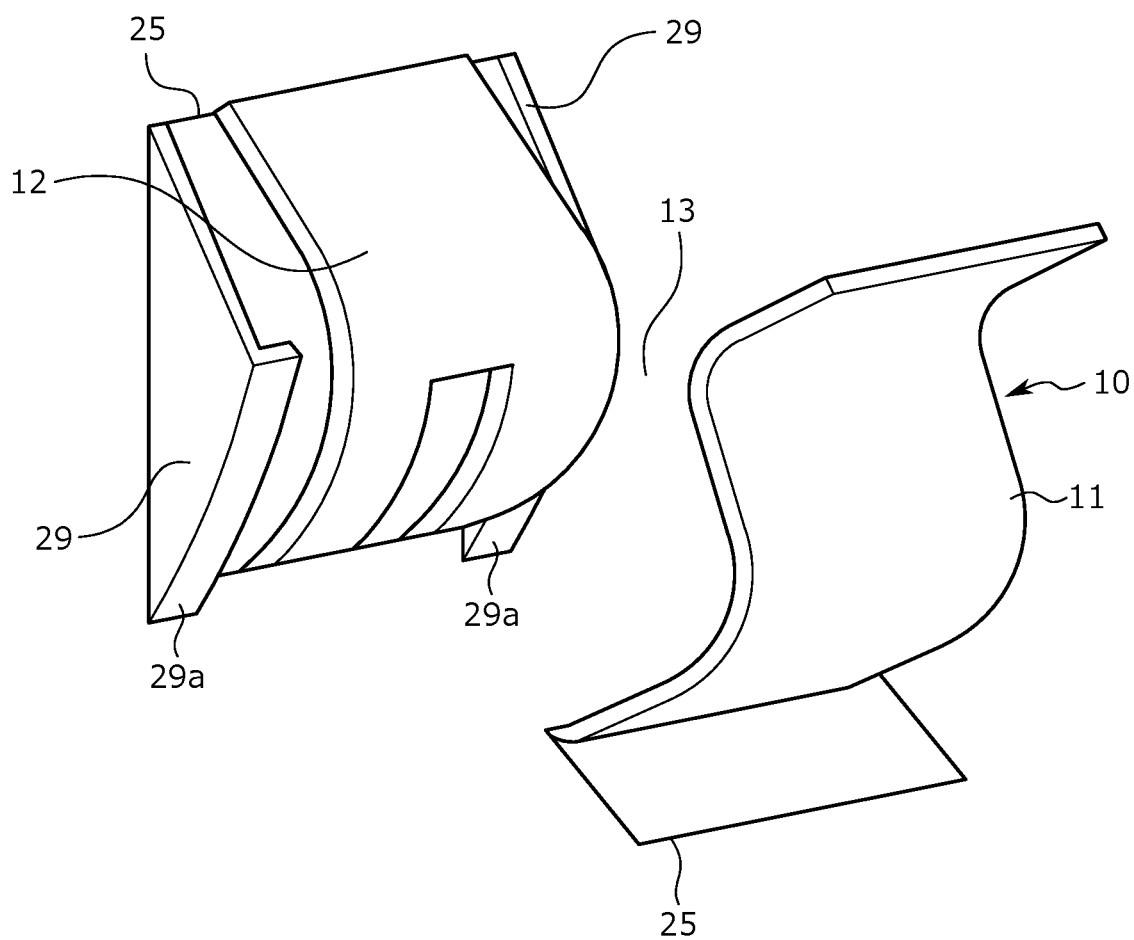
FIG. 11 is a diagram illustrating a portion to which the leg holding member is attached in the cover member.
Figure 12:
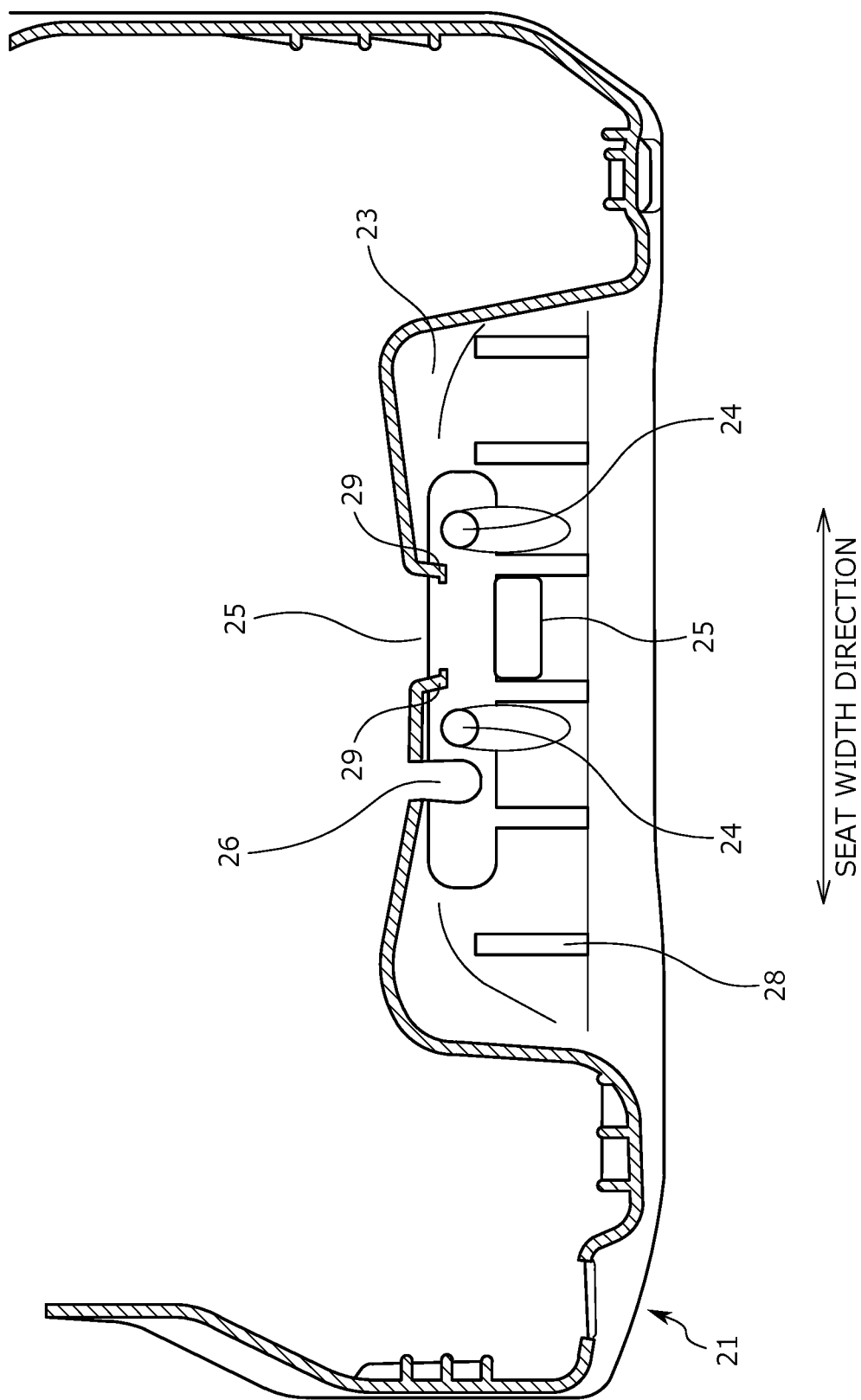
FIG. 12 is a diagram in which the cover member cut along a cutting plane of FIG. 10 is viewed from a direction of an arrow X-X.
Figure 13:
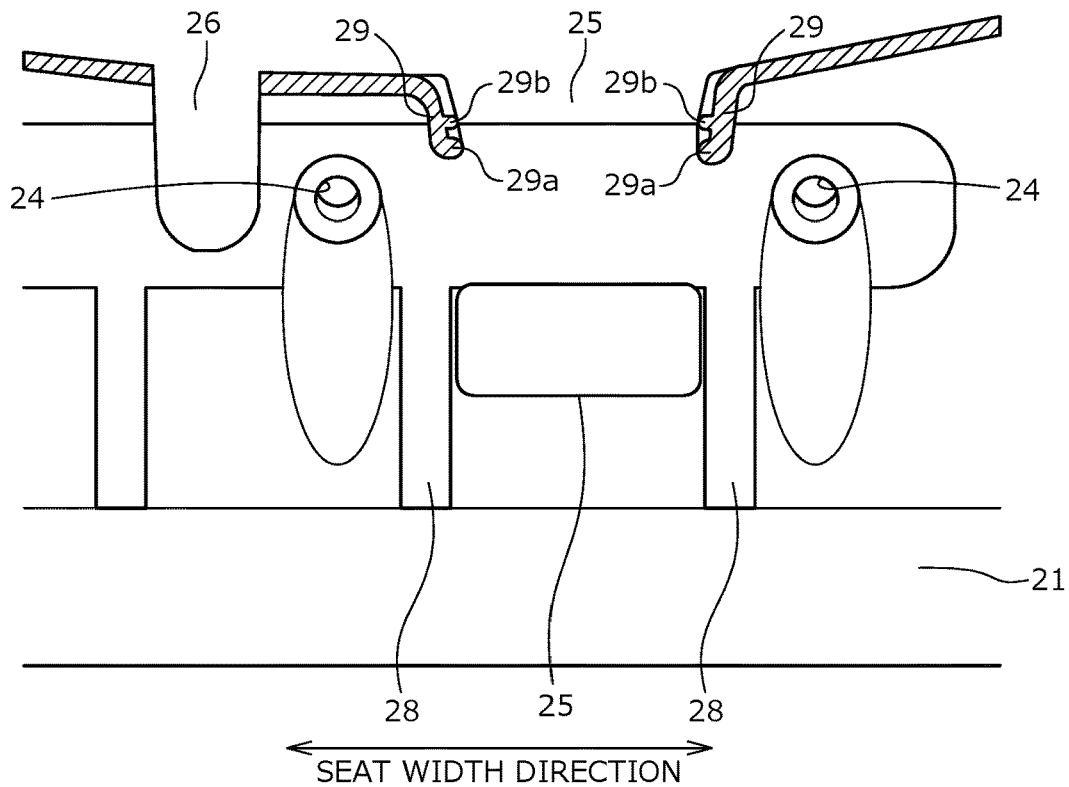
FIG. 13 is a partially enlarged view illustrating a protrusion portion and surroundings thereof in FIG. 12.

Next, a configuration of the cover member 20 is described with reference to FIGS. 8 to 13. FIGS. 8 to 10 are diagrams illustrating the cover member 20, where FIG. 8 is a perspective view, FIG. 9 is a plan view, and FIG. 10 is a front view. FIG. 11 is a diagram illustrating a portion to which the leg holding member 10 is attached in the cover member 20. FIG. 12 is a diagram in which the cover member 20 cut along a cutting plane (indicated by a one-dotted chain line in the drawing) of FIG. 10 is viewed in a direction of an arrow X-X. FIG. 13 is a partially enlarged view illustrating protrusion portions 29 and the surroundings thereof in FIG. 12.

The cover member 20 is used to protect the lower portion of the vehicle seat S including the slide rail mechanism Sr while covering the lower portion from above and is formed by a resin molded product. Further, in the present embodiment, the cover member 20 covers at least a portion of the leg holding member 10 in such a manner that the leg holding member 10 is attached to a predetermined portion of the cover member 20.

A detailed configuration of the cover member 20 according to the present embodiment is described. An appearance of the cover member 20 is illustrated in FIGS. 8 to 10. Additionally, in the present embodiment, the cover member 20 is divided into two parts in the front to back direction and is formed by the combination of the front cover 21 and a rear cover 22. The rear cover 22 covers the rear end portions of the slide rail mechanisms Sr or a device disposed on the rear side among the devices disposed below the vehicle seat S.

The front cover 21 is located at the front side in relation to the rear cover 22 and covers devices disposed below the vehicle seat S. Further, the leg holding member 10 is attached to a front portion of the front cover 21 as illustrated in FIG. 11.

The front cover 21 is now described in more detail. The front cover 21 is a cover which has a substantially square shape in planar view and includes an upper wall, side walls, and a front wall as illustrated in FIGS. 8 and 9. The side walls of the front cover 21 are located on the outside in relation to the slide rail mechanisms Sr in the seat width direction. The front wall of the front cover 21 is located on the front side in relation to the slide rail mechanisms Sr. The upper wall of the front cover 21 is located on the upper side in relation to the seat support brackets Sk fixed to the upper end of the slide rail mechanisms Sr.

Further, the recessed accommodation recess 23 is formed at a position located at the substantially central portion of the front end portion of the front cover 21 in the seat width direction as illustrated in FIG. 8. The accommodation recess 23 is formed in a substantially tapered shape so that a longitudinal length (a length in the front to back direction) is shorter toward the bottom of the accommodation recess 23 and extends elongated in the seat width direction. Then, the holding target portion 1a enters the accommodation recess 23 to be accommodated therein while the holding target portion 1a of the unfolded leg member 1 is held by the leg holding member 10 as illustrated in FIG. 6. That is, the accommodation recess 23 is an accommodation space configured to accommodate the holding target portion 1a which is held by the leg holding member 10.

Additionally, the horizontal width (the length in the seat width direction) of the accommodation recess 23 is slightly longer than the length of the holding target portion 1a in the seat width direction. For this reason, the holding target portion 1a can be accommodated in the accommodation recess 23 from one end to the other end of the holding target portion 1a in the seat width direction.

Further, a plurality of fixed portions 24 for fixing the front cover 21 to the vehicle body is provided at the bottom of a portion recessed to form the accommodation recess 23 as illustrated in FIGS. 12 and 13. The fixed portions 24 (in the present embodiment, two fixed portions) are circular holes for fixing screws and are formed to be separated from each other in the seat width direction. Additionally, the number of the fixed portions 24 is not particularly limited and can be set to any desired number.

Further, through-holes 25 which are formed to attach the leg holding member thereto are provided in walls (hereinafter, inner walls) defining the accommodation recess 23 in the front cover 21. The through-holes 25 are rectangular holes and are formed at the inner wall located on the front side and the inner wall located on the rear side as illustrated in FIGS. 8, 9, and 10.

Then, the leg holding member 10 is attached to the front cover 21 through the through-hole 25. Specifically, as illustrated in FIG. 11, the first portion 11 of the leg holding member 10 extends through the through-hole 25 formed in the inner wall located on the front side into the accommodation recess 23. Similarly, the second portion 12 of the leg holding member 10 extends through the through-hole 25 formed in the inner wall located on the rear side into the accommodation recess 23. Further, a portion located between the first portion 11 and the second portion 12 in the leg holding member 10 extends around behind the front cover 21 (specifically, below the portion recessed to form the accommodation recess 23) and is caught by a portion located between the through-holes 25.

By the above-described method, the leg holding member 10 is attached to the front cover 21. Further, in a state in which the leg holding member 10 is attached to the front cover 21, the first portion 11 and the second portion 12 are accommodated inside the accommodation recess 23 to be exposed. That is, the leg holding member 10 is attached to the cover member 20 while the first portion 11 and the second portion 12 are exposed.

Further, a slit hole 26 is formed at a position adjacent to the through-hole 25 in the inner wall located on the rear side as illustrated in FIGS. 8 and 10. The slit hole 26 is a hole into which a hook member of the locking device 3 is inserted or out of which a hook member protrudes. Since the slit hole 26 is formed, the hook member can be operated while avoiding the interference with the front cover 21 when the hook member is engaged with or disengaged from the holding target portion 1a of the leg member 1.

Further, a central portion of the inner wall located on the rear side in the seat width direction is projected (bulged) toward the front to form a projection portion 27. The projection portion 27 is projected in a substantially triangular shape in side view. Specifically, the projection portion is projected to extend forward as it goes upward. Then, in a state in which the holding target portion 1a of the leg member 1 is held by the leg holding member 10 in the accommodation recess 23, as illustrated in FIG. 7A, the projection portion 27 is located above the holding target portion 1a and faces the holding target portion 1a in the up and down direction.

Further, the inner wall located on the front side is inclined to extend forward as it goes upward as illustrated in FIG. 8. Furthermore, the inner wall located on the front side has raised portions 28 which are formed by raising a portion of the upper surface (the surface). The raised portions 28 are protruded beads which extend to be inclined along the upper surface of the inner wall located on the front side.

In the present embodiment, as illustrated in FIG. 8, the raised portions 28 (six raised portions in the configuration illustrated in FIG. 8) are provided at substantially regular intervals in the seat width direction. In a state in which the holding target portion 1a of the leg member 1 is held by the leg holding member 10, each of the plurality of raised portions 28 is located on the front side in relation to the holding target portion 1a and faces the holding target portion 1a. Additionally, the above-described through-hole 25 (specifically, the through-hole 25 formed in the inner wall located on the front side) is disposed between two raised portions 28 located at a position closest to the central portion of the accommodation recess 23 in the seat width direction.

Further, the inner wall located on the rear side has the protrusion portions 29 which protrude forward as illustrated in FIGS. 8, 10, 11, and 12. Each of the protrusion portions 29 serves as a "deformation amount restriction portion" of the present disclosure. The deformation amount restriction portion and each of the protrusion portions 29 serving as the deformation amount restriction portion is described in detail below.

Deformation Amount Restriction Portion

The vehicle seat S has the deformation amount restriction portion as described above. The deformation amount restriction portion is used to restrict the elastic deformation amount of the leg holding member 10 when the holding target portion 1a of the leg member 1 passes through the introduction opening 13 of the leg holding member 10. Here, the elastic deformation amount of the leg holding member 10 indicates the deformation amount generated when the leg holding member 10 is elastically deformed so that the second portion 12 of the leg holding member 10 is separated from the first portion 11.

Then, since the deformation amount restriction portion is provided, the elastic deformation amount of the leg holding member 10 is restricted to a predetermined amount or less. That is, it is possible to prevent the leg holding member 10 from being deformed more than necessary. Accordingly, it is possible to satisfactorily maintain a state in which the leg holding member 10 appropriately holds the leg member 1.

In the present embodiment, the deformation amount restriction portion is integrally provided with the cover member 20. In other words, the deformation amount restriction portion according to the present embodiment is formed by a portion of the cover member 20. More specifically, in the present embodiment, as described above, each of the protrusion portions 29 of the cover member 20 forms the deformation amount restriction portion. The protrusion portion 29 is located within the accommodation recess 23 and protrudes forward within the accommodation recess 23 as illustrated in FIGS. 8, 10, and 12. More specifically, the protrusion portion 29 protrudes toward a side on which the second portion 12 of the leg holding member 10 is located.

The protrusion portion 29 is now described in more detail. The protrusion portion 29 is a protruded portion having a substantially triangular shape in side view and the protrusion amount thereof increases toward the upper end of the protrusion portion 29. Further, the protrusion portion 29 is provided at a position adjacent to the leg holding member 10 in the seat width direction as illustrated in FIG. 11. Specifically, the protrusion portion 29 is provided at the edge portion of the through-hole 25 in the front cover 21 as illustrated in FIGS. 10 and 11. In this way, in the present embodiment, the protrusion portion 29 serving as the deformation amount restriction portion is provided at a position on the side of the leg holding member 10.

Further, the protrusion portion 29 is provided at each of the edge portion on one end side (left side) and the edge portion on the other end side (right side) of the through-hole 25 in the seat width direction as illustrated in FIGS. 10 and 11. That is, the protrusion portions 29 are provided as a pair to be separated from each other in the seat width direction. Further, when the pair of protrusion portions 29 is viewed from the front of the seat, a left protrusion portion 29 corresponds to a first deformation amount restriction portion and a right protrusion portion 29 corresponds to a second deformation amount restriction portion. The left protrusion portion 29 and the right protrusion portion 29 are formed to be symmetrical at the right and left sides and the protrusion amounts of the left and the right protrusion portions 29 are the same.

Further, each of the protrusion portions 29 is provided at the projection portion 27 formed in the inner wall located on the rear side in the front cover 21 as illustrated in FIG. 10. More specifically, the left protrusion portion 29 (the first deformation amount restriction portion) is provided at the central portion of the projection portion 27 in the seat width direction. The right protrusion portion 29 (the second deformation amount restriction portion) is provided at a position adjacent to the end portion (specifically, the right end portion) of the projection portion 27 in relation to the central portion of the projection portion 27 in the seat width direction.

Further, as described above, the through-hole 25 is provided between the two protrusion portions 29 and the second portion 12 of the leg holding member 10 is inserted into the through-hole 25. In other words, the leg holding member 10 is disposed between the left protrusion portion 29 and the right protrusion portion 29 in the seat width direction.

Further, each of the protrusion portions 29 includes a flange portion 29a which is formed by bending a distal end portion (a free end portion) thereof inward in the seat width direction. Further, each of the protrusion portions 29 protrudes so that a gap between the protrusion portions 29 decreases toward the distal end portion as illustrated in FIG. 13. That is, each of the protrusion portions 29 extends in a direction slightly inclined with respect to the front to back direction, more specifically, in an inclined state toward the pair of protrusion portions 29 as it approaches the distal end portion.

Further, as illustrated in FIG. 13, a portion slightly located rearward of the distal end portion of the protrusion portion 29 has a rib 29b which is formed to protrude inward in the seat width direction for the purpose of reinforcing the protrusion portion 29.

Figure 14:
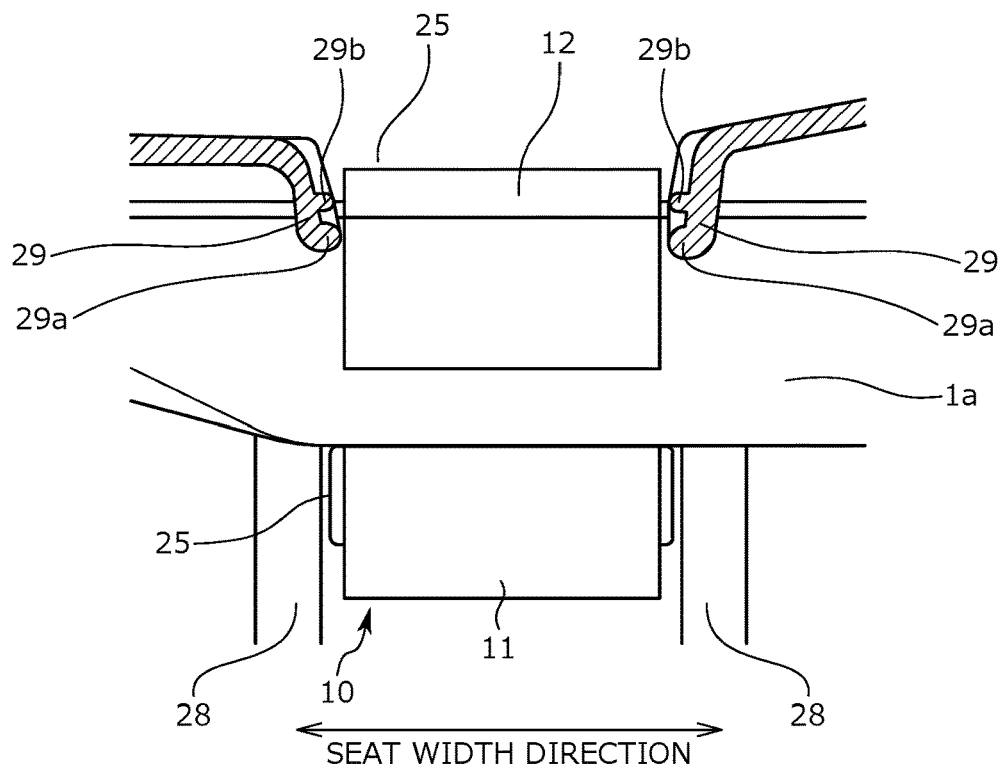
FIG. 14 is a diagram illustrating a state in which the protrusion portion is in contact with the holding target portion of the leg member.

The protrusion portions 29 with the above-described configuration are located behind the holding target portion 1a when the holding target portion 1a of the leg member 1 is held by the leg holding member 10. In such a state, the protrusion portions 29 are brought into contact with portions located on opposite sides of the leg holding member 10 (in other words, portions adjacent to the second portion 12 in the seat width direction) in the holding target portion 1a in FIG. 14. FIG. 14 is a diagram illustrating a state in which the protrusion portions 29 are in contact with the holding target portion 1a of the leg member 1. Additionally, FIG. 14 is a diagram which is viewed at the same point of sight as that of FIG. 13 when the holding target portion 1a of the leg member 1 is held by the leg holding member 10, specifically, a diagram in which the cover member 20 cut along the cutting plane in FIG. 10 is viewed in the direction of the arrow X-X.

In this way, since each of the protrusion portions 29 is brought into contact with the holding target portion 1a, the holding target portion 1a is locked by the protrusion portion 29 even when the holding target portion 1a will move backward in relation to the contact position. Accordingly, the deformation amount of the leg holding member 10 generated when the holding target portion 1a presses the second portion 12 backward can be restricted to a predetermined amount (an amount in accordance with the protrusion amount of the protrusion portion 29, specifically, a deformation amount at a time point at which the protrusion portion 29 is brought into contact with the holding target portion 1a). As a result, it is possible to satisfactorily maintain a state in which the leg holding member 10 appropriately holds the leg member 1.

Additionally, in the present embodiment, each of the protrusion portions 29 is brought into contact with the holding target portion 1a at a flange portion 29a formed at the distal end portion thereof. Accordingly, since the area of the contact portion with respect to the holding target portion 1a in the protrusion portion 29 increases, the protrusion portion 29 serving as the deformation amount restriction portion can efficiently restrict the elastic deformation amount of the leg holding member 10.

Further, in the present embodiment, the protrusion portion 29 is provided at the edge portion of the through-hole 25 in the front cover 21. Accordingly, the strength of the front cover 21 which is decreased by the through-hole 25 (particularly, the strength in the periphery of the through-hole 25) can be reinforced by the protrusion portion 29. Further, since the protrusion portion 29 is provided at the edge portion of the through-hole 25, it is possible to prevent foreign matter from entering the through-hole 25.

Further, in the present embodiment, the protrusion portions 29 are provided as a pair of right and left protrusion portions. Accordingly, it is possible to more effectively restrict the deformation amount of the leg holding member 10 compared to a configuration in which only one protrusion portion 29 is provided. Further, the leg holding member 10 can be disposed through the effective use of a space between the protrusion portions 29. However, the present disclosure is not limited thereto and the number of the protrusion portions 29 can be set to any desired number.

Further, the two protrusion portions 29 protrude while being inclined with respect to the front to back direction so that the gap between the protrusion portions 29 becomes short as they go forward. The leg holding member 10 is attached to the front cover 21 between the protrusion portions 29 in the front cover 21, whereby the second portion 12 of the leg holding member 10 extends through the through-hole 25. In such a configuration, the second portion 12 of the leg holding member 10 easily is passed through the through-hole 25. After the second portion 12 is passed through the through-hole 25, it is possible to allow the second portion 12 not to be easily removed from the through-hole 25 by the second portion 12 being held between the two protrusion portions 29.

Here, the arrangement position of the protrusion portion 29 is described in detail, as illustrated in FIGS. 12 and 13. Each of the protrusion portions 29 is provided at a position different from the fixed portions 24 formed in the front cover 21 in the seat width direction. More specifically, the front cover 21 has the two fixed portions 24 and each of the two protrusion portions 29 is disposed between the fixed portions 24 in the seat width direction. With such a positional relationship, the protrusion portion 29 can be provided through the effective use of a space between the fixed portions 24. Further, the protrusion portions 29 appropriately restrict the elastic deformation amount of the leg holding member 10 while preventing the interference between the protrusion portions 29 and the fixed portions 24 by the above-described positional relationship.

Further, as illustrated in FIG. 10, one (specifically, the left protrusion portion 29) of the two protrusion portions 29 is disposed between the through-hole 25 and the slit hole 26 in the seat width direction. In other words, the left protrusion portion 29 is disposed to be located between the locking device 3 and the leg holding member 10 in the seat width direction. With such a positional relationship, the locking device 3, the leg holding member 10, and the deformation amount restriction portion (specifically, the protrusion portion 29) can be provided with a more compact configuration.

Other Embodiments

In the above-described embodiment, an example of a configuration of the conveyance seat of the present disclosure is described. However, the above-described embodiment is merely an example for easily understanding the present disclosure and does not limit the present disclosure. That is, the present disclosure can be modified and improved without departing from the spirit thereof and the present disclosure, of course, includes the equivalent thereof.

Further, in the above-described embodiment, the deformation amount restriction portion is integrally provided with the cover member 20. Specifically, the protrusion portion 29 provided inside the accommodation recess 23 of the front cover 21 forms the deformation amount restriction portion. Such a configuration is advantageous in that the number of components is smaller than that of a case in which the deformation amount restriction portion is provided separately from the cover member 20. However, the deformation amount restriction portion is not limited to the above-described embodiment and several modifications thereof are considered. Hereinafter, various modified examples of the deformation amount restriction portion are described.

First Modification

Figure 15:
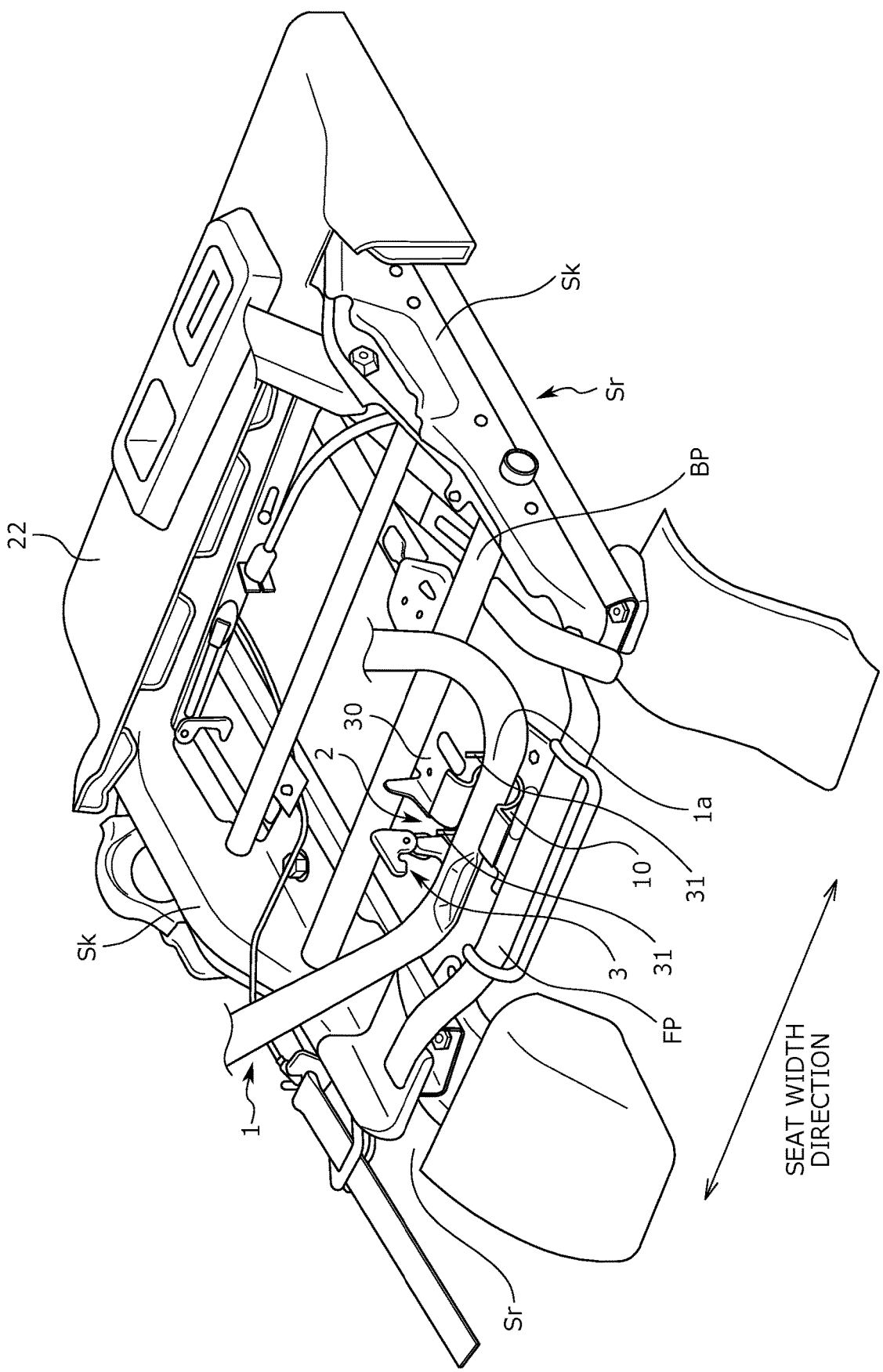
FIG. 15 is a diagram illustrating a first modification.
Figure 16:
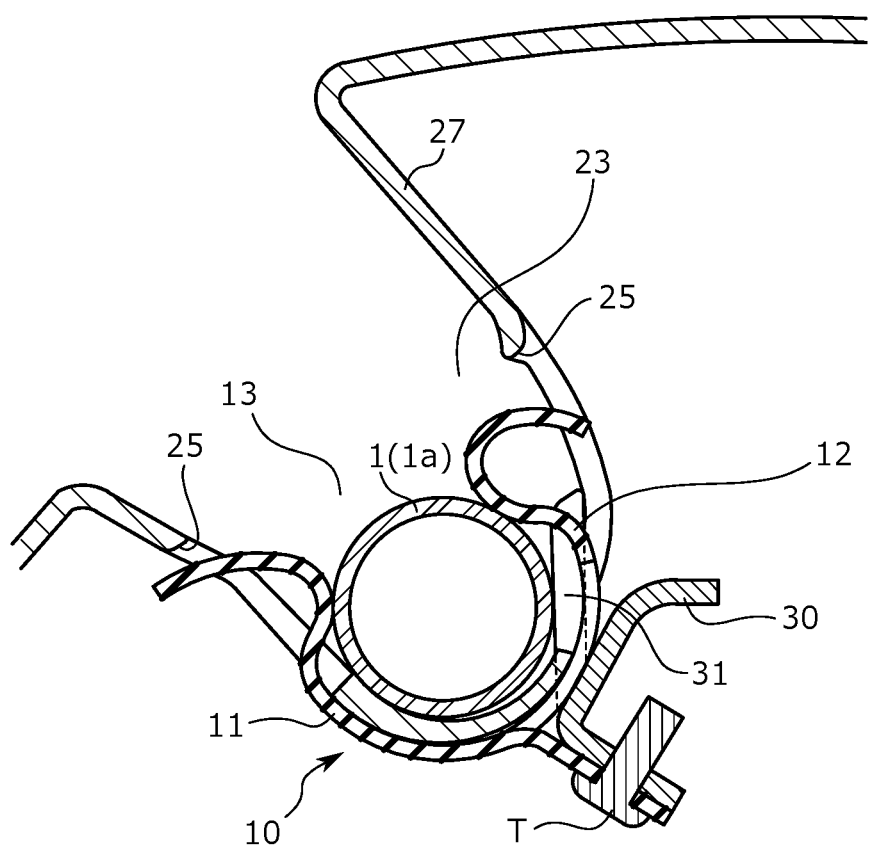
FIG. 16 is a diagram illustrating a cross section of a leg holding member and surroundings thereof according to the first modification.

A first modification is a case in which a plurality of cut-raised portions 31 formed by cutting a portion of the leg holding member support bracket 30 for supporting the leg holding member 10 are used as the deformation amount restriction portion as illustrated in FIGS. 15 and 16. FIGS. 15 and 16 are diagrams illustrating the first modification, where FIG. 15 is a perspective view illustrating a lower structure of the vehicle seat S according to the first modification and FIG. 16 is a diagram illustrating the cross section of the leg holding member 10 and the surroundings thereof according to the first modification.

The cut-raised portions 31 (two cut-raised portions in the case illustrated in FIG. 15) are formed and are located at opposite sides of the leg holding member 10 in the seat width direction as illustrated in FIG. 15. Then, each of the cut-raised portions 31 is brought into contact with the holding target portion 1a at the rear side of the holding target portion 1a while the holding target portion 1a of the leg member 1 is held by the leg holding member 10 as illustrated in FIG. 16. Accordingly, the same operation as that of the protrusion portion 29 can be obtained by the cut-raised portion 31. As a result, it is possible to prevent the leg holding member 10 from being elastically deformed more than necessary.

Additionally, in the first modification, a clearance hole (not illustrated) is provided in the front cover 21 in order to avoid the interference between the front cover 21 and the cut-raised portions 31 and the distal end portions of the cut-raised portions 31 may be put (exposed) to the outside of the front cover 21 through the clearance hole.

Second Modification

Figure 17:
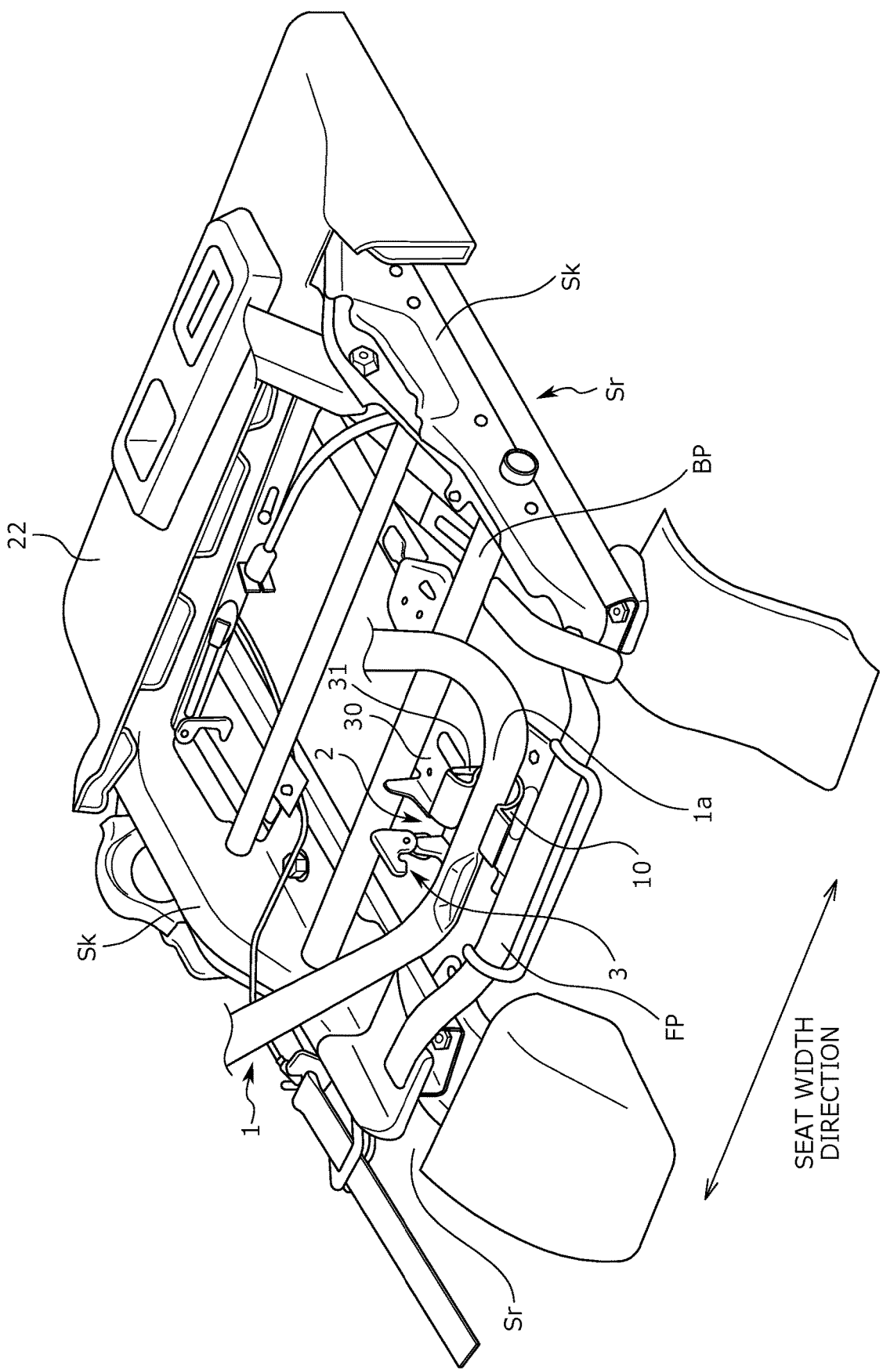
FIG. 17 is a diagram illustrating a second modification.

A second modification is a case in which a cut-raised portion 31 formed by cutting a portion of the leg holding member support bracket 30 is used as the deformation amount restriction portion similarly to the first modification. In the second modification, as illustrated in FIG. 17, only one cut-raised portion 31 is formed and the cut-raised portion 31 is formed at the same position as the leg holding member 10 in the seat width direction. More specifically, in the second modification, the cut-raised portion 31 is located right behind the second portion 12 of the leg holding member 10. The second modification is different from the first modification in such a point. Additionally, FIG. 17 is a diagram illustrating the second modification and is a perspective view illustrating a lower structure of the vehicle seat S according to the second modification.

Then, in the second modification, when the leg holding member 10 is elastically deformed so that the second portion 12 is separated from the first portion 11 with the holding target portion 1a of the leg member 1 pressing the second portion 12, the cut-raised portion 31 is brought into contact with the second portion 12 at a time point at which the deformation amount reaches a predetermined amount. Accordingly, the second portion 12 is locked by the cut-raised portion 31 so that the further elastic deformation is restricted. In this way, in the second modification, the cut-raised portion 31 serving as the deformation amount restriction portion directly is brought into contact with the leg holding member 10 instead of the holding target portion 1a to restrict the elastic deformation amount of the leg holding member 10. As a result, it is possible to prevent the leg holding member 10 from being elastically deformed more than necessary.

Third Modification

Figure 18:
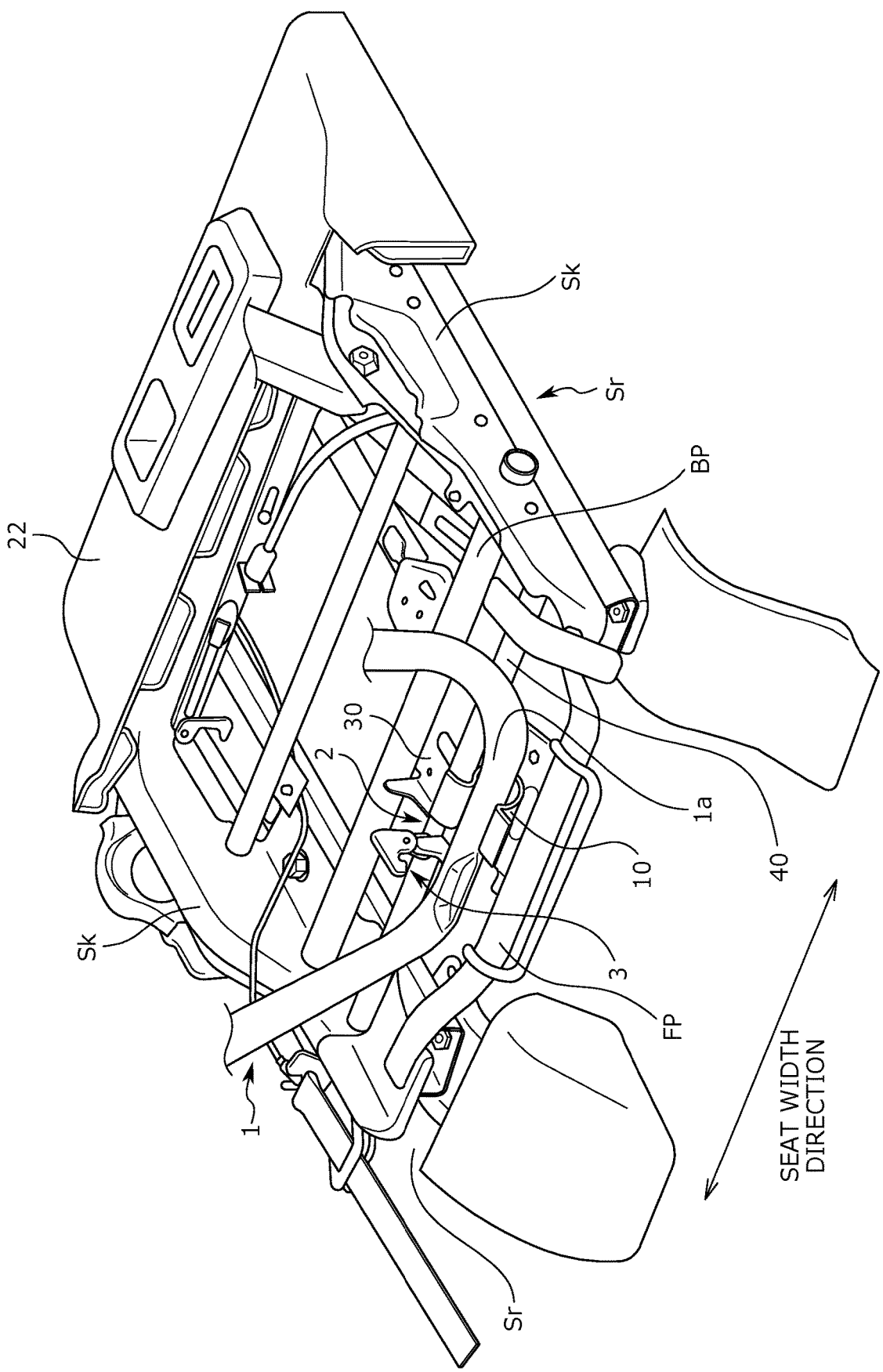
FIG. 18 is a diagram illustrating a third modification.
Figure 19:
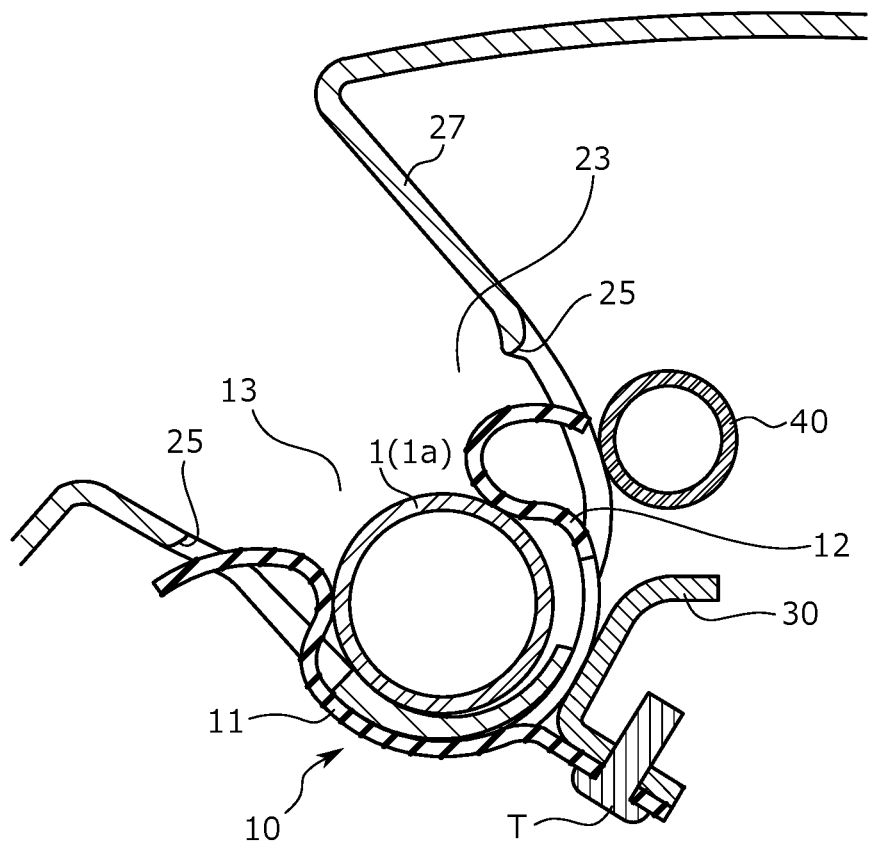
FIG. 19 is a diagram illustrating a cross section of a leg holding member and surroundings thereof according to the third modification.

A third modification is a case in which an spanning member 40 extending between the pair of right and left slide rail mechanisms Sr is used as the deformation amount restriction portion as illustrated in FIGS. 18 and 19. FIGS. 18 and 19 are diagrams illustrating the third modification, where FIG. 18 is a perspective view illustrating a lower structure of the vehicle seat S according to the third modification and FIG. 19 is a diagram illustrating the cross section of the leg holding member 10 and the surroundings thereof according to the third modification.

The spanning member 40 is formed by a hollow pipe extending elongated in the seat width direction as illustrated in FIG. 19 and is disposed right behind the second portion 12 of the leg holding member 10 in the front to back direction as illustrated in FIG. 18. Additionally, a member constituting the spanning member 40 is not limited to the hollow pipe and may be, for example, a wire or bracket (steel plate).

Then, in the third modification, as understood from FIG. 19, when the leg holding member 10 is elastically deformed so that the second portion 12 is separated from the first portion 11 with the holding target portion 1a of the leg member 1 pressing the second portion 12, the spanning member 40 is brought into contact with the second portion 12 at a time point at which the deformation amount reaches a predetermined amount. Accordingly, the second portion 12 is locked by the spanning member 40 so that the further elastic deformation is restricted. In this way, in the third modification, the spanning member 40 serving as the deformation amount restriction portion directly is brought into contact with the leg holding member 10 to restrict the elastic deformation amount of the leg holding member 10. As a result, it is possible to prevent the leg holding member 10 from being elastically deformed more than necessary.

TABLE OF REFERENCE NUMERALS

| | |
|---|---|
| 1 | leg member |
| 1a | holding target portion |
| 2 | leg holding mechanism |
| 3 | locking device |
| 10 | leg holding member |
| 11 | first portion |
| 12 | second portion |
| 13 | introduction opening |
| 20 | cover member |
| 21 | front cover |
| 22 | rear cover |
| 23 | accommodation recess |
| 24 | fixed portion |
| 25 | through-hole |
| 26 | slit hole |
| 27 | projection portion |
| 28 | raised portion |
| 29 | protrusion portion (deformation amount restriction portion, first deformation amount restriction portion, second deformation amount restriction portion) |
| 29a | flange portion |
| 29b | rib |
| 30 | leg holding member support bracket |
| 31 | cut-raised portion |
| 40 | spanning member |
| BP | first connection pipe |
| FP | second connection pipe |
| P | stowage floor |
| S | vehicle seat (conveyance seat) |
| S1 | seat back |
| S2 | seat cushion |
| Sc | connection member |
| Sh | seat main body |
| Sr | slide rail mechanism |
| Sk | seat support bracket |
| T | tapping screw |

What is claimed is:
1. A conveyance seat comprising:
a seat main body which is movable between a use position and a non-use position;
a leg member that is attached to a lower end portion of the seat main body and is movable along with the seat main body;
a leg holding member that is elastically deformable to hold a holding target portion of the leg member, the leg holding member including a first portion and a second portion which are separated from each other and configured to hold the holding target portion having passed through an introduction opening of the leg holding member formed between the first portion and the second portion, with the holding target portion interposed between the first portion and the second portion when the leg member moves along with the seat main body moving toward the use position; and
a deformation amount restriction portion which restricts a deformation amount of the leg holding member,
wherein the leg holding member is elastically deformed so that the second portion is separated from the first portion by the holding target portion passing through the introduction opening,
wherein further deformation of the leg holding member is prevented by the deformation amount restriction portion coming into contact with the holding target portion of the leg member.

2. The conveyance seat according to claim 1, wherein the deformation amount restriction portion is provided at a position adjacent to the leg holding member.

3. The conveyance seat according to claim 1, further comprising:
a cover member that covers at least a portion of the leg holding member with the leg holding member attached to the cover member,
wherein the deformation amount restriction portion is formed by a portion of the cover member.

4. The conveyance seat according to claim 3,
wherein the cover member includes a projection portion which is projected to face the holding target portion at a position above the holding target portion held by the leg holding member,
wherein the deformation amount restriction portion includes a first deformation amount restriction portion and a second deformation amount restriction portion which are disposed to be separated from each other,
wherein the first deformation amount restriction portion is provided at a central portion of the projection portion in a width direction of the seat main body, and
wherein the second deformation amount restriction portion is provided at a position adjacent to an end portion of the projection portion in relation to the central portion of the projection portion in the width direction.

5. The conveyance seat according to claim 3,
wherein the cover member includes a raised portion which is formed by raising a portion of a surface of the cover member, and
wherein the raised portion is located in front of the holding target portion and faces the holding target portion with the holding target portion held by the leg holding member.

6. The conveyance seat according to claim 5,
wherein the raised portion extends in a front to back direction on the surface of the cover member.

7. The conveyance seat according to claim 1, further comprising:
a locking device which is engaged with the holding target portion held by the leg holding member to lock the leg member,
wherein the deformation amount restriction portion is disposed between the locking device and the leg holding member in a width direction of the seat main body.

8. A conveyance seat comprising:
a seat main body which is movable between a use position and a non-use position;
a leg member that is attached to a lower end portion of the seat main body and is movable along with the seat main body;
a leg holding member that is elastically deformable to hold a holding target portion of the leg member, the leg holding member including a first portion and a second portion which are separated from each other and configured to hold the holding target portion having passed through an introduction opening of the leg holding member formed between the first portion and the second portion, with the holding target portion interposed between the first portion and the second portion when the leg member moves along with the seat main body moving toward the use position; and
a deformation amount restriction portion which restricts a deformation amount of the leg holding member,
wherein the leg holding member is elastically deformed so that the second portion is separated from the first portion by the holding target portion passing through the introduction opening,
wherein the deformation amount restriction portion includes a first deformation amount restriction portion and a second deformation amount restriction portion which are disposed to be separated from each other in a seat width direction,
wherein the leg holding member is disposed between the first deformation amount restriction portion and the second deformation amount restriction portion.

9. The conveyance seat according to claim 8,
wherein a front end of the first deformation amount restriction portion and a front end of the second deformation amount restriction portion are located at the same position in a front to back direction.

10. The conveyance seat according to claim 8, further comprising:
a cover member that covers at least a portion of the leg holding member with the leg holding member attached to the cover member,
wherein the deformation amount restriction portion is formed by a portion of the cover member.

11. The conveyance seat according to claim 10,
wherein the leg holding member is attached to the cover member with the first portion and the second portion being exposed,
wherein the cover member has an accommodation space configured to accommodate the holding target portion held by the leg holding member,
wherein the first portion and the second portion are accommodated to be exposed in the accommodation space with the leg holding member attached to the cover member, and
wherein the deformation amount restriction portion is formed by a protrusion portion that protrudes toward a side on which the second portion is located inside the accommodation space in the cover member.

12. The conveyance seat according to claim 10,
wherein the cover member includes a projection portion which is projected to face the holding target portion at a position above the holding target portion held by the leg holding member,
wherein the first deformation amount restriction portion is provided at a central portion of the projection portion in a width direction of the seat main body, and
wherein the second deformation amount restriction portion is provided at a position adjacent to an end portion of the projection portion in relation to the central portion of the projection portion in the width direction.

13. The conveyance seat according to claim 10,
wherein the cover member includes a raised portion which is formed by raising a portion of a surface of the cover member, and
wherein the raised portion is located in front of the holding target portion and faces the holding target portion with the holding target portion held by the leg holding member.

14. The conveyance seat according to claim 13,
wherein the raised portion extends in a front to back direction on the surface of the cover member.

15. A conveyance seat comprising:
a seat main body which is movable between a use position and a non-use position;
a leg member that is attached to a lower end portion of the seat main body and is movable along with the seat main body;
a leg holding member that is elastically deformable to hold a holding target portion of the leg member, the leg holding member including a first portion and a second portion which are separated from each other and configured to hold the holding target portion having passed through an introduction opening of the leg holding member formed between the first portion and the second portion, with the holding target portion interposed between the first portion and the second portion when the leg member moves along with the seat main body moving toward the use position;
a deformation amount restriction portion which restricts a deformation amount of the leg holding member; and
a cover member that covers at least a portion of the leg holding member with the leg holding member attached to the cover member,
wherein the leg holding member is elastically deformed so that the second portion is separated from the first portion by the holding target portion passing through the introduction opening; and
wherein the deformation amount restriction portion is formed by a portion of the cover member,
wherein the leg holding member is attached to the cover member with the first portion and the second portion being exposed,
wherein the cover member has an accommodation space configured to accommodate the holding target portion held by the leg holding member,
wherein the first portion and the second portion are accommodated to be exposed in the accommodation space with the leg holding member attached to the cover member,
wherein the deformation amount restriction portion is formed by a protrusion portion in the cover member, and
wherein the protrusion portion protrudes toward a side on which the second portion is located inside the accommodation space.

16. The conveyance seat according to claim 15,
wherein the cover member has a through-hole formed to attach the leg holding member to the cover member, and
wherein the protrusion portion is provided at an edge portion of the through-hole in the cover member.

17. The conveyance seat according to claim 15,
wherein the cover member has a fixed portion configured to fix the cover member to a vehicle body, and
wherein the protrusion portion is provided at a position different from the fixed portion in a width direction of the seat main body.

18. The conveyance seat according to claim 17,
wherein the cover member includes a plurality of fixed portions that includes the fixed portion, and
wherein the protrusion portion is disposed between the plurality of fixed portions in the width direction.

19. The conveyance seat according to claim 15,
wherein the protrusion portion includes a flange portion formed by bending a distal end portion of the protrusion portion and the flange portion is brought into contact with a portion adjacent to the second portion in the leg member to restrict the deformation amount.

* * * * *